US012020521B2

(12) United States Patent
Simms et al.

(10) Patent No.: US 12,020,521 B2
(45) Date of Patent: Jun. 25, 2024

(54) APPARATUS TO ALLOW FOR STORAGE OR HOLDING OF ITEMS, ESPECIALLY FOR DELIVERIES AND/OR PICKUPS

(71) Applicant: HOME VALET, INC., Vienna, VA (US)

(72) Inventors: John M. Simms, Vienna, VA (US); John M. Simms, Jr., Vienna, VA (US)

(73) Assignee: HOME VALET, INC., Vienna, VA (US)

(*) Notice: Subject to any disclaimer, the term of this patent is extended or adjusted under 35 U.S.C. 154(b) by 0 days.

(21) Appl. No.: 17/214,236

(22) Filed: Mar. 26, 2021

(65) Prior Publication Data
US 2021/0304539 A1 Sep. 30, 2021

Related U.S. Application Data

(60) Provisional application No. 63/000,976, filed on Mar. 27, 2020.

(51) Int. Cl.
G06Q 10/083 (2024.01)
G06Q 10/0832 (2023.01)
G07C 9/00 (2020.01)

(52) U.S. Cl.
CPC ..... G07C 9/00896 (2013.01); G06Q 10/0832 (2013.01); G06Q 10/0838 (2013.01); G07C 9/00309 (2013.01); G07C 2009/0092 (2013.01)

(58) Field of Classification Search
CPC ........... G06Q 10/0832; G06Q 10/0838; G06Q 10/083
See application file for complete search history.

(56) References Cited

U.S. PATENT DOCUMENTS

| 3,328,102 A | 6/1967 | Stackhouse |
| 5,245,329 A | 9/1993 | Gokcebay |

(Continued)

FOREIGN PATENT DOCUMENTS

| CN | 203269096 U | 11/2013 |
| DE | 102009032406 A1 | 1/2011 |
| WO | 2014/080389 A2 | 5/2014 |

OTHER PUBLICATIONS

Jolly, Jennifer, "Protect your online purchases from 'porch pirates'," usatoday.com, 2016, Retrieved from https://www.usatoday.com/story/tech/columnist/2016/10/09/protect-your-online-purchases-porch-pirates/91753692/ (Year: 2016).*

(Continued)

*Primary Examiner* — Rupangini Singh
*Assistant Examiner* — Bryan J Kirk
(74) *Attorney, Agent, or Firm* — Williams Mullen; R. Brian Drozd

(57) ABSTRACT

A system include a server configured to: receive a request from a computing device to unlock a delivery box; determine whether the request is authenticated; and send an unlock signal to the delivery box in response to the request being authenticated, such that when the unlock signal is sent to the delivery box, the delivery box is remotely unlocked in response thereto. The delivery box may include a container comprising an interior configured to hold an item; an access door configured to close the container; a UV LED configured to be activated to disinfect the interior when the access door is closed relative to the container; and a controller that controls the UV LED. The controller is connected to a network and a user is configured to control the controller over the network.

7 Claims, 17 Drawing Sheets

(56) References Cited

U.S. PATENT DOCUMENTS

| | | | |
|---|---|---|---|
| 5,397,884 | A | 3/1995 | Saliga |
| 6,323,782 | B1 | 11/2001 | Stephens et al. |
| 6,933,532 | B2 | 8/2005 | Arnold et al. |
| 6,933,832 | B1 | 8/2005 | Simms et al. |
| 9,211,025 | B1 | 12/2015 | Elhawwashy |
| 9,535,421 | B1 | 1/2017 | Canoso et al. |
| 9,552,564 | B1 | 1/2017 | Martenis |
| 9,733,646 | B1 | 8/2017 | Nusser et al. |
| 10,268,982 | B2 | 4/2019 | Clarke et al. |
| 10,449,889 | B2 | 10/2019 | Letson et al. |
| 11,270,249 | B1 * | 3/2022 | Kassaei ............ G06Q 10/0835 |
| 2002/0035515 | A1 | 3/2002 | Moreno |
| 2002/0042665 | A1 | 4/2002 | Kakuta |
| 2003/0040980 | A1 | 2/2003 | Nakajima et al. |
| 2004/0177008 | A1 | 9/2004 | Yang |
| 2004/0238326 | A1 | 12/2004 | Lichti |
| 2004/0254802 | A1 | 12/2004 | Miller et al. |
| 2005/0104716 | A1 | 5/2005 | Simms et al. |
| 2007/0247276 | A1 | 10/2007 | Murchison et al. |
| 2008/0162304 | A1 | 7/2008 | Ourega |
| 2009/0138374 | A1 | 5/2009 | Cohen |
| 2010/0250446 | A1 | 9/2010 | Mackenzie et al. |
| 2013/0124606 | A1 | 5/2013 | Carpenter et al. |
| 2013/0240673 | A1 | 9/2013 | Schlosser et al. |
| 2013/0318097 | A1 | 11/2013 | Gambhir et al. |
| 2014/0032034 | A1 | 1/2014 | Raptopoulos et al. |
| 2014/0136414 | A1 | 5/2014 | Abhyanker |
| 2014/0201001 | A1 | 7/2014 | Rellas et al. |
| 2014/0254896 | A1 | 9/2014 | Zhou et al. |
| 2014/0258181 | A1 | 9/2014 | Begen |
| 2015/0006005 | A1 | 1/2015 | Yu et al. |
| 2015/0035437 | A1 | 2/2015 | Panopoulos et al. |
| 2015/0120094 | A1 | 4/2015 | Kimchi et al. |
| 2015/0158599 | A1 | 6/2015 | Sisko |
| 2015/0254760 | A1 | 9/2015 | Pepper |
| 2015/0310388 | A1 | 10/2015 | Jamthe |
| 2015/0317596 | A1 | 11/2015 | Hejazi |
| 2015/0321595 | A1 | 11/2015 | Hempsch et al. |
| 2015/0329260 | A1 | 11/2015 | Singh |
| 2015/0371468 | A1 | 12/2015 | Mackin et al. |
| 2016/0026967 | A1 | 1/2016 | Shah et al. |
| 2016/0063436 | A1 | 3/2016 | Coles et al. |
| 2016/0068357 | A1 | 3/2016 | Bastian, II |
| 2016/0140496 | A1 | 5/2016 | Simms et al. |
| 2016/0171568 | A1 | 6/2016 | Cao et al. |
| 2016/0187876 | A1 | 6/2016 | Diperna et al. |
| 2016/0235236 | A1 | 8/2016 | Byers et al. |
| 2016/0239802 | A1 | 8/2016 | Burch, V et al. |
| 2016/0275450 | A1 | 9/2016 | Chang |
| 2016/0300187 | A1 | 10/2016 | Kashi et al. |
| 2016/0364989 | A1 | 12/2016 | Speasl et al. |
| 2017/0036798 | A1 | 2/2017 | Prahlad et al. |
| 2017/0083862 | A1 * | 3/2017 | Loubriel ............ G06Q 10/0835 |
| 2017/0090484 | A1 | 3/2017 | Obaidi |
| 2017/0123421 | A1 | 5/2017 | Kentley et al. |
| 2017/0132532 | A1 | 5/2017 | Myers |
| 2017/0147975 | A1 | 5/2017 | Natarajan et al. |
| 2017/0213173 | A1 | 7/2017 | Dong |
| 2017/0243156 | A1 | 8/2017 | Janis et al. |
| 2017/0286905 | A1 * | 10/2017 | Richardson ........ G06Q 10/0832 |
| 2017/0320569 | A1 | 11/2017 | Gordon et al. |
| 2017/0344912 | A1 | 11/2017 | Magnay |
| 2018/0024554 | A1 | 1/2018 | Brady et al. |
| 2018/0033235 | A1 | 2/2018 | Dotterweich et al. |
| 2018/0060928 | A1 | 3/2018 | Sadler et al. |
| 2018/0068253 | A1 | 3/2018 | Simms et al. |
| 2018/0101818 | A1 | 4/2018 | Simms et al. |
| 2018/0122022 | A1 | 5/2018 | Kelly et al. |
| 2018/0137454 | A1 * | 5/2018 | Kulkarni ............... G08G 1/205 |
| 2018/0144299 | A1 | 5/2018 | Simms et al. |
| 2018/0300679 | A1 | 10/2018 | Mahmood |
| 2018/0365639 | A1 | 12/2018 | Simms et al. |
| 2018/0365640 | A1 | 12/2018 | Simms et al. |
| 2018/0365641 | A1 * | 12/2018 | Zhu ....................... G06K 7/1417 |
| 2019/0019135 | A1 * | 1/2019 | Vij ...................... G06Q 10/083 |
| 2019/0057350 | A1 | 2/2019 | Simms et al. |
| 2019/0220000 | A1 | 7/2019 | Ibe |
| 2019/0236522 | A1 * | 8/2019 | Steves ................. G06Q 10/083 |
| 2019/0251505 | A1 | 8/2019 | Simms et al. |
| 2019/0279151 | A1 | 9/2019 | Felice et al. |
| 2020/0027054 | A1 * | 1/2020 | Hall .................... G06Q 10/083 |
| 2020/0219348 | A1 * | 7/2020 | Hanlon ................ H04W 4/029 |
| 2020/0250614 | A1 * | 8/2020 | Zhu ..................... G07C 9/00571 |
| 2020/0387863 | A1 * | 12/2020 | Ruth ....................... G06F 9/542 |
| 2021/0142276 | A1 * | 5/2021 | Gupte ............... G06Q 10/0838 |
| 2021/0298508 | A1 * | 9/2021 | Chowdhury ........ G07C 9/00571 |

OTHER PUBLICATIONS

Sheffi; "Combinatorial Auctions in the Procurement of Transportation Services" Interfaces; vol. 34, No. 4, Jul.-Aug. 2004, pp. 245-252.

Xu et al; "Efficient Intermodal Transportation Auctions for 828 e-commerce Logistics with Transportation Costs"; Transportation Research Part B; Oct. 2015; pp. 80:322-337.

Figliozzi; "Performance and Analysis of Spot Truck-Load Procurement Markets Using Sequential Auctions"; ProQuest Dissertations and Theses Professional; 2004.

Saldanha; "Choosing the Right Information Coordinating Mechanism for the International Ocean Shipping Process"; ProQuest Dissertations and Theses Professional; 2006.

Sep. 22, 2022 International Preliminary Report on Patentability issued in International Patent Application No. PCT/US2021/024388.

Aug. 18, 2021 International Search Report issued in International Patent Application No. PCT/US2021/024388.

https://www.groovypost.com/tips/cancel-amazon-order-after-shipped; 2021.

* cited by examiner

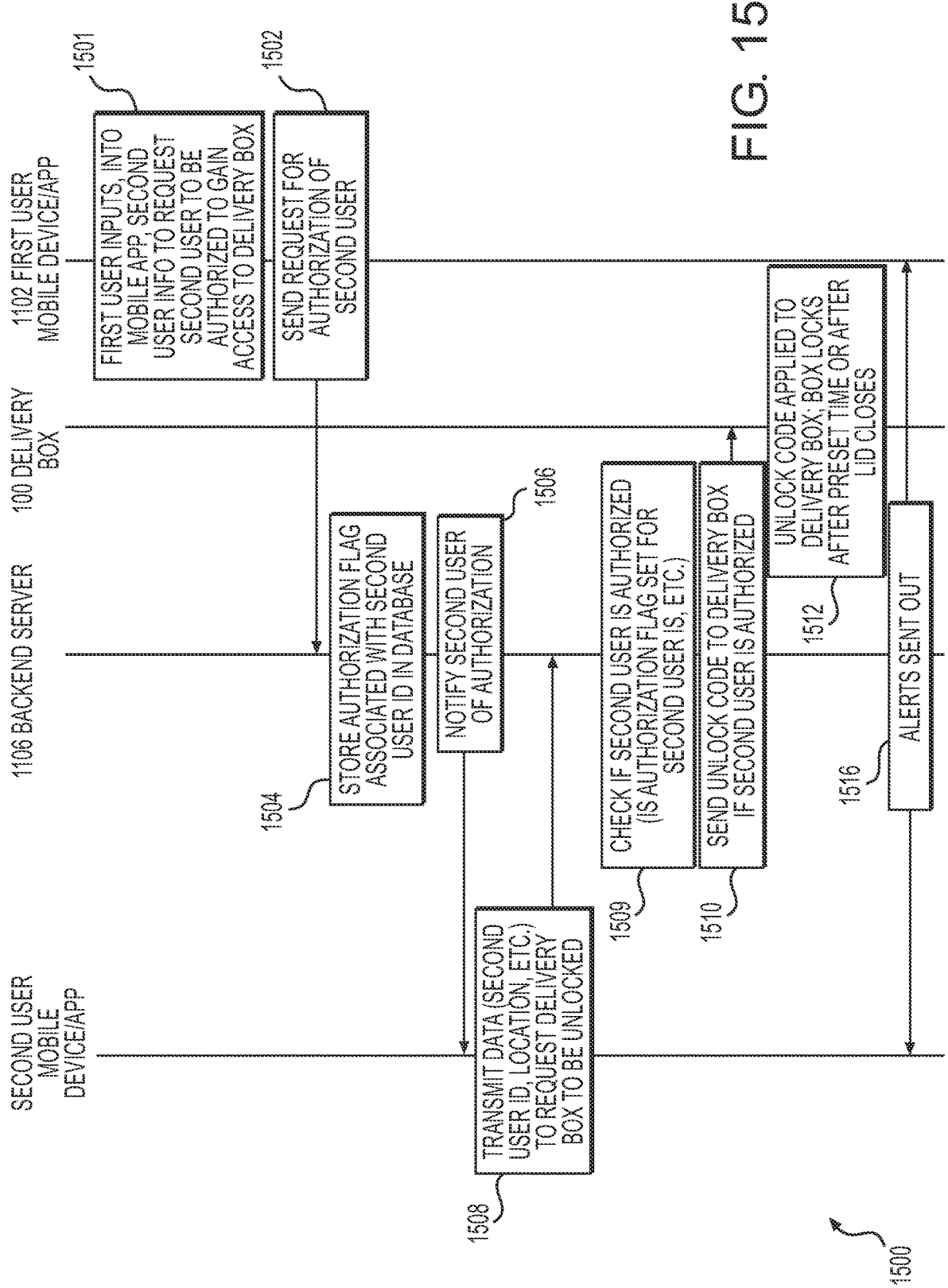

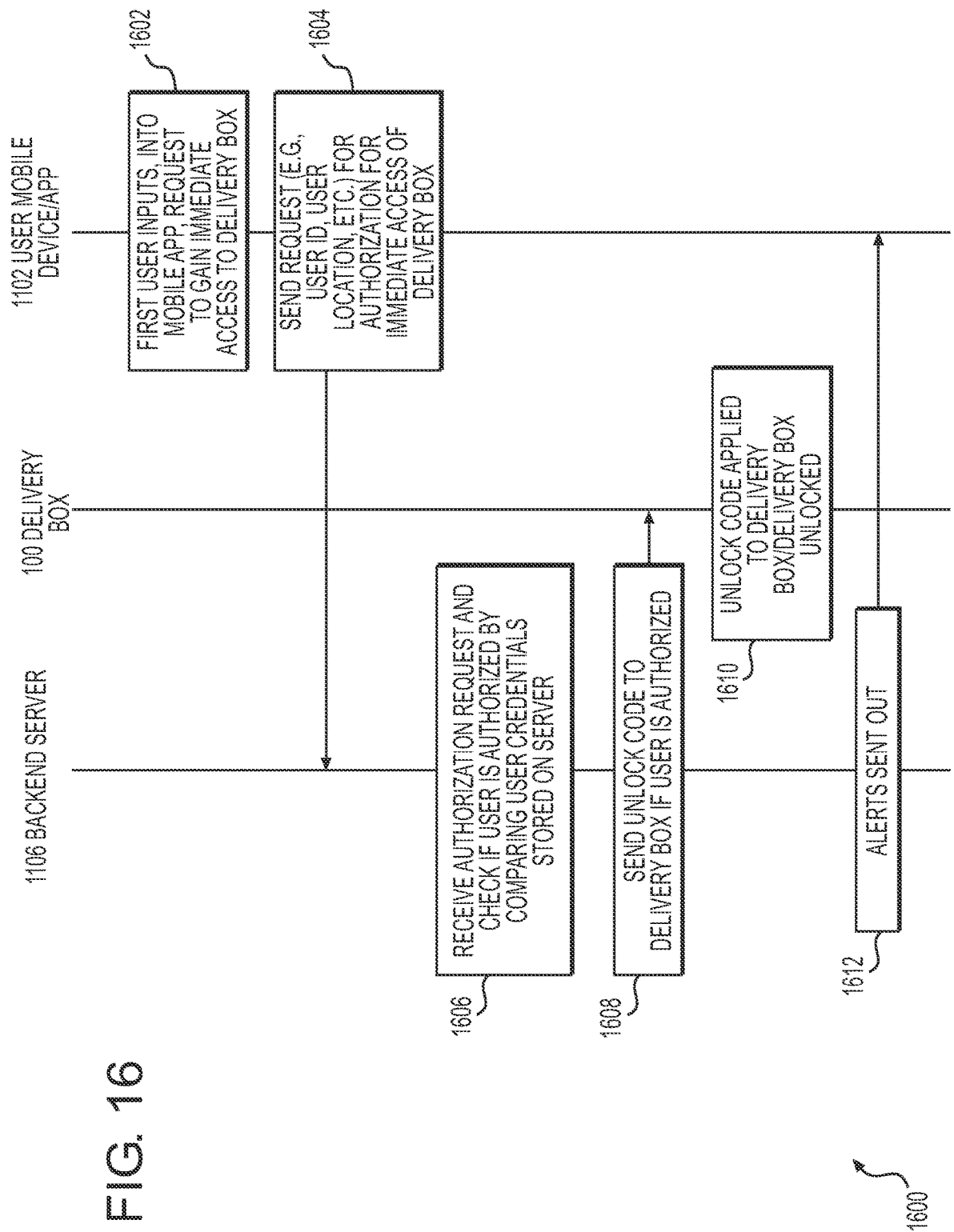

US 12,020,521 B2

APPARATUS TO ALLOW FOR STORAGE OR HOLDING OF ITEMS, ESPECIALLY FOR DELIVERIES AND/OR PICKUPS

BACKGROUND

The shipment of parcels for delivery to a home or office has been a cumbersome and time-consuming process for both the commercial carrier delivering the parcel and for the parcel recipient. Typically, products purchased remotely, such as through a catalog or over a phone call or the Internet, must be delivered to a purchaser by a commercial carrier. Commercial carriers may request that the intended recipient be present at the time of delivery to sign off on receipt of the package. However, in the absence of the recipient, it is necessary for the commercial carrier to return the package to the delivery hub and await personal pickup by the recipient. This time-consuming process is frequently averted by agreement between the recipient and the commercial carrier that personal receipt of a delivered parcel is not required (or the commercial carrier does not have any obligation to make sure that the intended recipient be present at the time of delivery to sign off on receipt of the package). In these cases, the commercial carrier commonly drops the package in an unsecured area near the front entrance of a building, such as near the front porch area of a home or office. However, this practice carries the obvious liability of exposing the commercial carrier and/or the recipient to the risk that the unsecured parcel may be stolen or possibly damaged by exposure to environmental elements (e.g., heat, cold, rain, etc.) as well as being potentially left at such unsecured area exposed to the environmental elements for an extended time at the detriment of the interior of some packages (e.g., items that need to be kept cool).

Accordingly, there is no system for a storage device for temporarily, securely storing delivered goods associated with a home or office that enables a recipient to transport the delivered goods to/from an intended destination at a home or office in an intended condition.

SUMMARY

Some aspects of the present disclosure overcome the inconvenience and limitations of prior systems described above by providing a storage device that allows temporary storage of delivered goods at home or office from (or to) a commercial carrier or other entity. The temporary storage device facilitates temporary storage of the delivered goods by providing a compartment with an access door associated with a locking device. Upon delivery, the commercial carrier is able to secure the delivered goods within the compartment by deactivating the locking device associated with the access door. The delivered goods remain securely stored within the temporary storage device until the locking device is unlocked by the intended recipient of the goods.

BRIEF DESCRIPTION OF THE DRAWINGS

Aspects of the present invention is further described in the detailed description which follows in reference to the noted plurality of drawings by way of non-limiting examples of embodiments of the present invention in which like reference numerals represent similar parts throughout the several views of the drawings and wherein:

FIG. 15 illustrates a method for delivering goods to a delivery box according to some embodiments.

FIG. 16 illustrates a method for unlocking a delivery box according to some embodiments.

DETAILED DESCRIPTION OF EMBODIMENTS

Embodiments of the present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto any combination of general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

Figure 1:
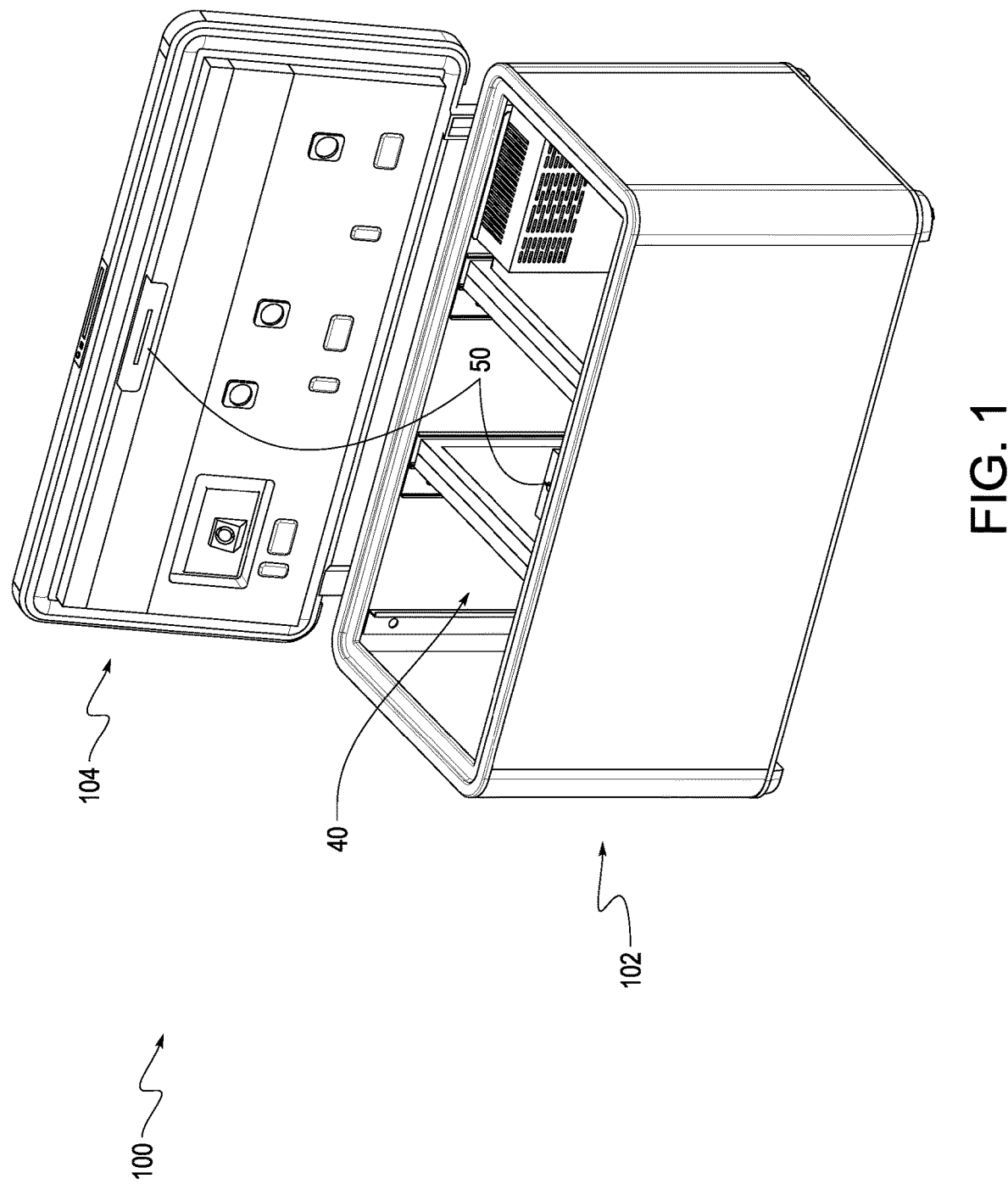
FIG. 1 is a delivery box in open position according to one embodiment.

Referring to FIG. 1, embodiments of the present disclosure include a delivery box 100 for temporarily storing goods. In an exemplary embodiment, the delivery box 100 includes a container 102 connected to an access door 104 with a locking device 50 associated therewith.

The access door 104 may be a hinged door wherein the door can be suitably locked by a locking system, such as an electromagnetic locking system, a key and lock system, an electronic coding device system, or any other locking mechanism. The access door 104 may have a plurality of components discussed later herein for the purposes of climate control, monitoring items within the container 102, emergency unlock system, processing system, storing data, communications systems, etc. For example, the access door 104 may include one or more or all of the following: temperature sensors, humidity sensors, lights, UV LEDs, cameras, fans, batteries, transceiver, microprocessor/controller, memory (RAM, ROM, etc.), locking system, climate control system and/or any other component discussed herein. In one embodiment, all electronics of the delivery box are housed in the access door. In another embodiment, all electronics of the delivery box except for the climate control system are housed in the access door 104. It should be understood, that, in another embodiment, all of the electronics could be stored in the container 102. Regardless, the access door 104 is configured to be locked at all times when it is closed so that it is secure to the container so that the container 102 is not able to be accessed while the access door 104 is closed to the container 102. The access door 104 may be insulated and made of any suitable material to allow for security of the box 100 and to allow for internal climate management of the box 100.

As mentioned above, FIG. 1 illustrates that the access door 104 is hinged with the container 102. However, it should be understood that the access door 104 may be mechanically or electrically connected with the container 102 or other device in any suitable manner to allow the access door 104 to lock the access door 104 to the container 102. For example, the access door 104 could be slidably connected to the container 102.

As will be discussed in more depth herein, the container 102 defines sidewalls that define an interior compartment 40 which may be completely enclosed when the access door 104 is closed. Also, this compartment 40 may be subdivided into zones using separation walls (referred to herein as "dividers"). The container 102 and the zones are discussed in more depth below with respect to FIGS. 3-4.

The delivery box 100 may be any shape or size, constructed of any suitable material, such as, metal, plastic, wood and/or the like and include any number of compartments, openings and/or the like. The storage device may be free-standing or incorporated into any existing structure, device or element, such as, for example, the device may be integral with a bench, planter, statute, wall and/or the like.

Any portion of the delivery box 100 may be decorated, painted or designed to match the building facade or to imitate a structure or plant (e.g., to conform to area specific housing community guidelines). The delivery box 100 could also be associated with a thermal control system, including, for example, cooling means, heating means, humidity control means, and/or insulating means to maintain the compartment or sections thereof at a desired environment/climate in cases where the contents of the parcel contained climate/environment sensitive goods or perishable items, such as frozen foods or produce, as will be explained below with reference to FIGS. 7 and 8.

Figure 2:
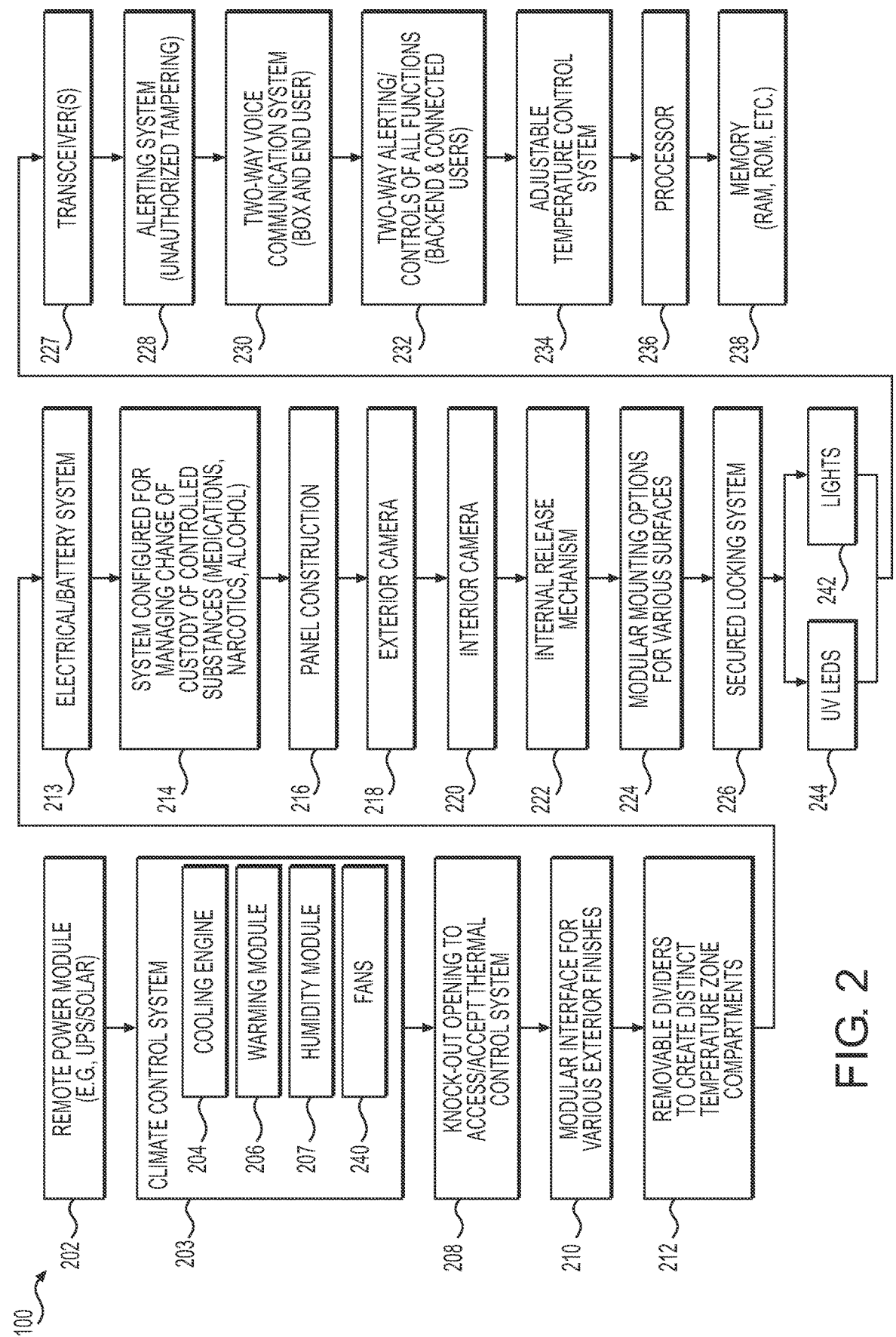
FIG. 2 is a diagram of a system of a delivery box according to one embodiment.

FIG. 2 illustrates various components and features that may be implemented into the delivery box 100 in various embodiments. In one embodiment, all of the components shown in FIG. 2 may be incorporated into the access door 104. In another embodiment, some of the components shown in FIG. 2 may be incorporated into the access door 104 and others may be incorporated into the container 102. It should be noted, however, that the delivery box 100 may include one or more of such components but the present invention should not be limited to these features and may include other features as well. As shown in FIG. 2, the delivery box 100 may include a remote power module 202, a climate control system 203 (which may include a cooling engine 204, a warming module 206, a humidity module 207, fans 240, etc.), a knock-out panel 208, a modular interface 210, removable dividers 212, electrical connection/battery system 213, a system configured to change of custody of controlled substances 214, panel construction 216, an exterior camera 218, an interior camera 220, an internal release mechanism 222, modular mounting system 224, secured locking system 226, transceiver(s) 227, alerting system 228, voice communication system 230, two-way alerting of functions system 232 and adjustable environmental control system 234, a processor 236, memory 238, lights 242, and/or UV LEDs 244. One or more of these items may be configured to communicate with each other. For example, the secured locking system 226 can access memory 238 to retrieve stored biometric data when a user is trying to unlock the locking system 226. Each of the above items will be discussed in more depth herein even though the reference numbers thereof may be not be specifically used.

The processor 236 (also referred to herein as the "controller") is configured to execute instructions and perform one or more of the tasks discussed herein. The processor 236 may be more than one processor and is in communication with memory 238 and one or more other components listed in FIG. 2. The processor 236 also is configured to control one or more of the components listed herein. For example, the processor 236 is configured to control the climate control system to change the climate in one or more zones of the compartment 40 of the delivery box 100.

Figure 3A:
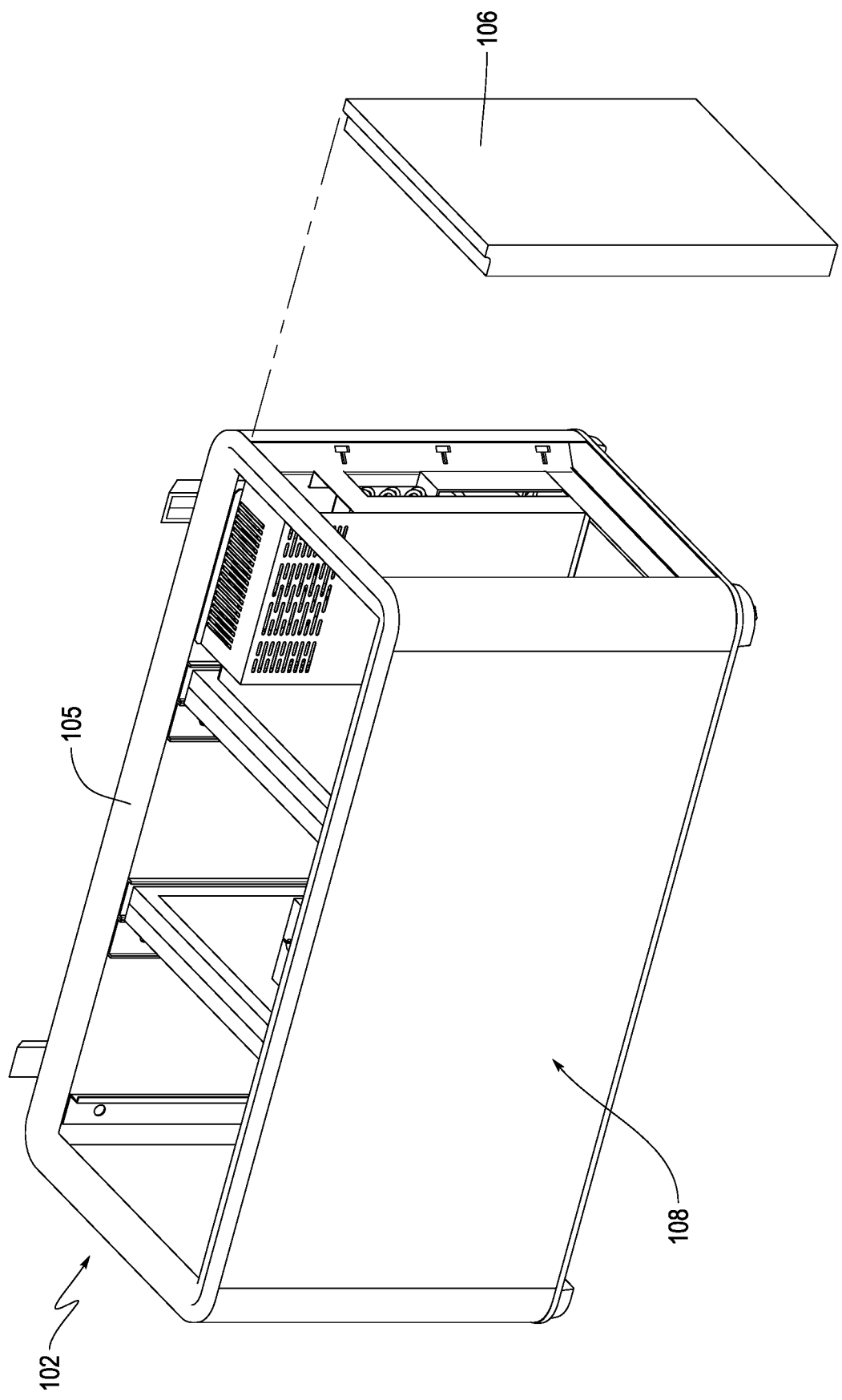
FIG. 3A illustrates a portion of a delivery box with a side panel in exploded view according to one embodiment.
Figure 3B:
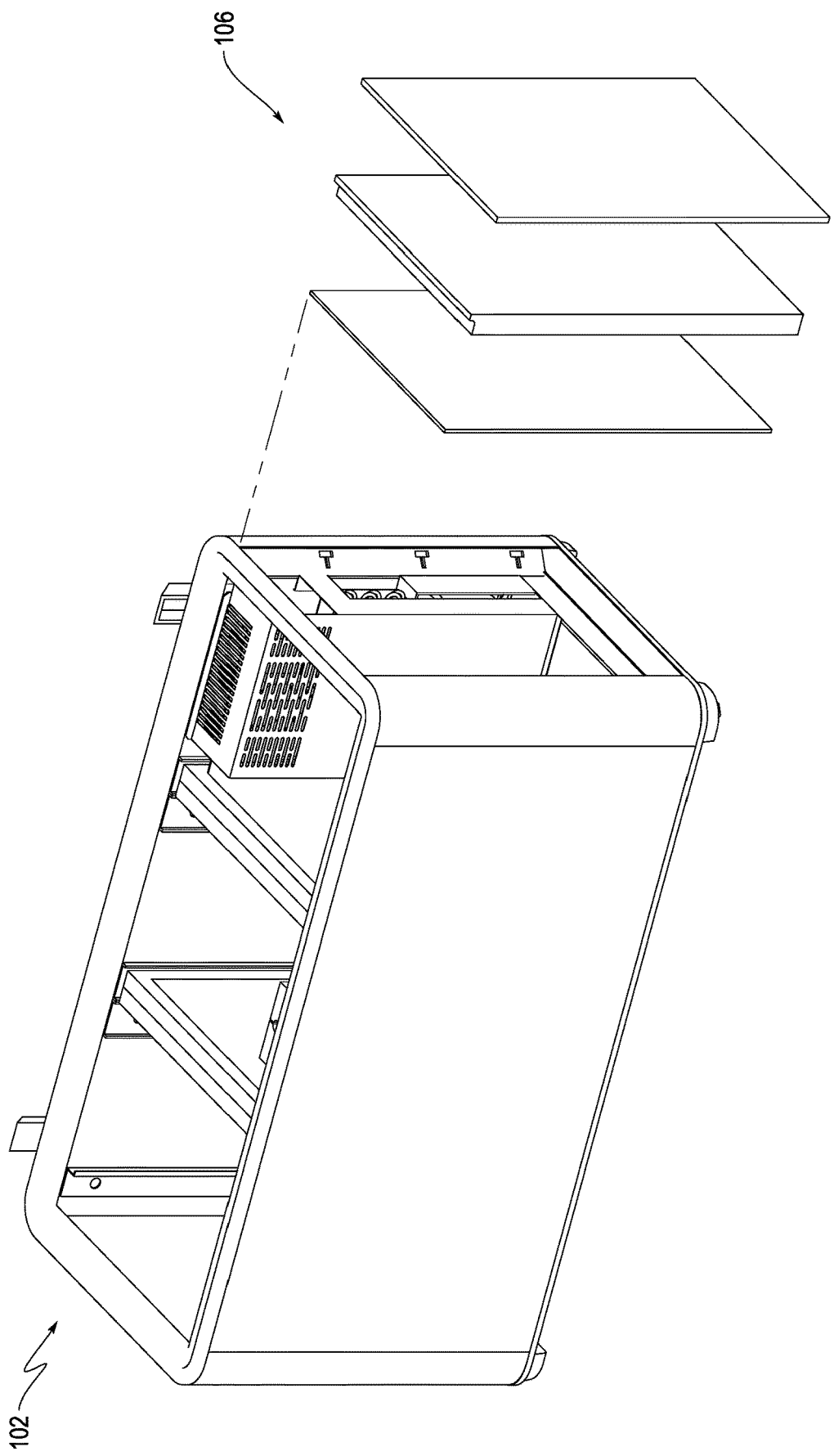
FIG. 3B illustrates the portion of a delivery box of FIG. 3A with a side panel in exploded view further exploded to show the layers thereof according to one embodiment.
Figure 4:
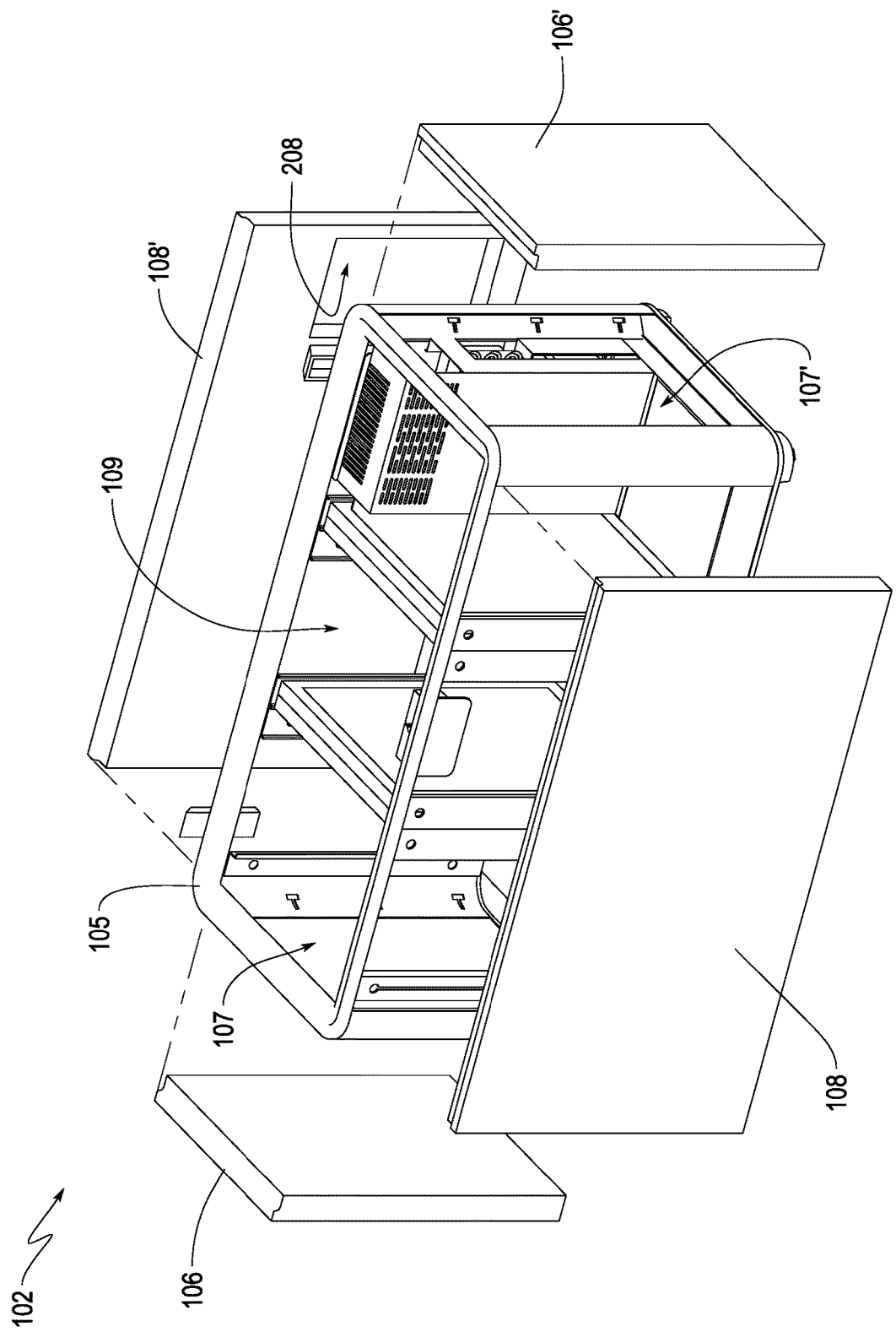
FIG. 4 illustrates the delivery box of FIG. 3A with each side panel in exploded view according to one embodiment.
Figure 5C:
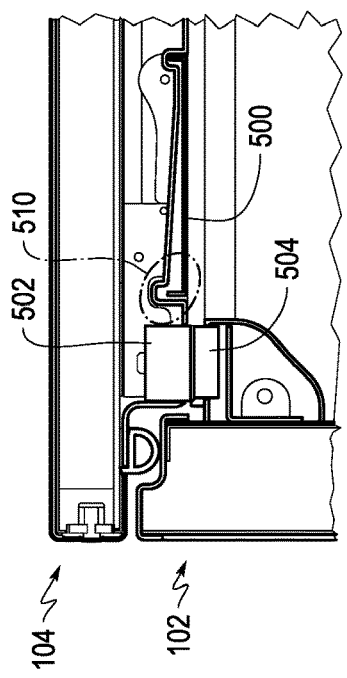
FIGS. 5A, 5B, 5C, and 5D illustrate a safe exiting system of a delivery box according to one embodiment.
Figure 5D:
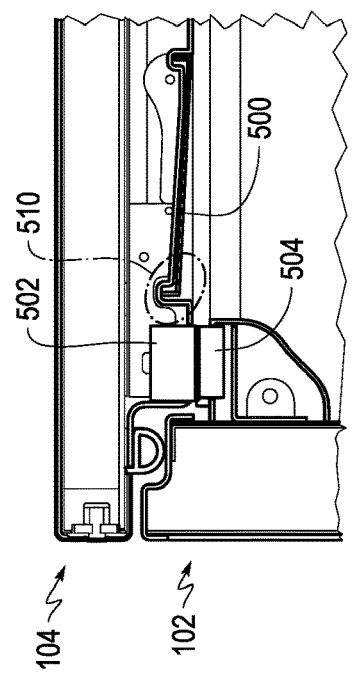
Figure 5A:
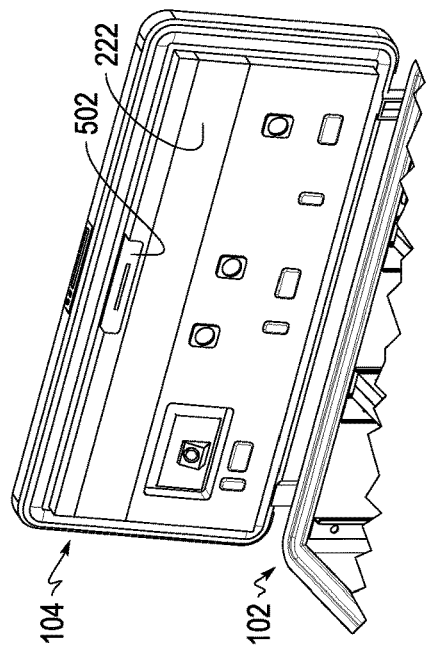
Figure 5B:
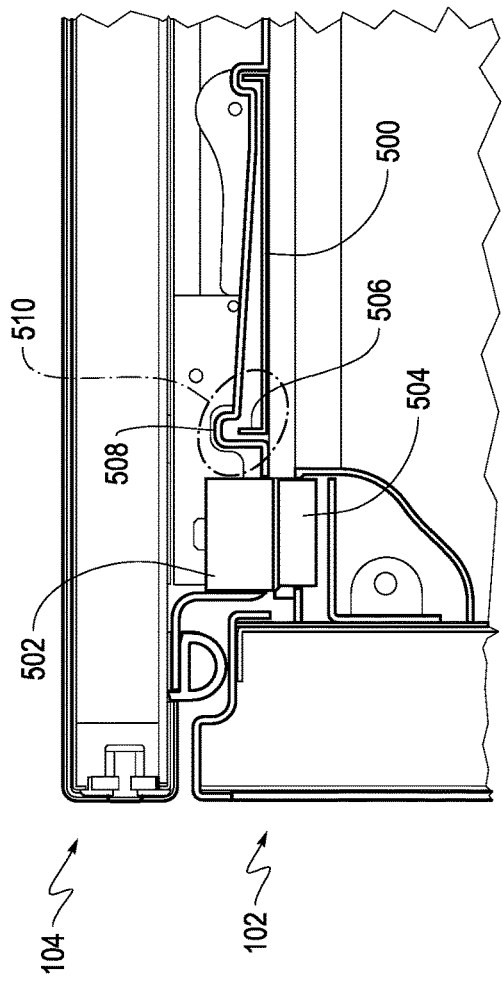

As shown in FIGS. 3-4, taken with FIG. 1, an exemplary delivery box 100 is defined by a panel construction 216 which may include a first side wall 106 and a second side wall 106', which are spaced apart by a front wall 108 and a rear wall 108'. The first side wall 106, the second side wall 106', the front wall 108 and the rear wall 108' (collectively referred to herein as "the side walls") define an interior space which includes the compartment 40 of the container 102 of the delivery box 100. The compartment 40 may be subdivided by removable dividers 212 which may provide different zones within the delivery box 100, such as a cooled zone, a heated zone, humidity controlled zone and the like (as discussed more in depth with respect to FIGS. 6-8). The side walls are connected to a frame 105 of the delivery box 100 and may be removably inserted into the frame 105. In one embodiment, each of the side walls are removable so that one or more of the side walls can be removed by a user and replaced with a different side wall(s).

Moreover, any of the side walls can have a multilayer construction. For example, as shown in FIG. 4, any of the side walls can have an internal panel, a center panel and an external panel. The external panel can have an aesthetic design and can be replaced with other aesthetic panels that may be chosen by the end user or at the point of assembly, and after replacing the external panel, the three panels can be reassembled and reinserted into the frame 105. The center panel can be made of an insulation material so as to insulate the thermal energy (e.g., heat, cool, etc.) within the compartment. The internal panel may be made of a material to protect the center panel and can also be replaced similar to the process mentioned above for the external panel.

Referring to FIG. 4, each of the side walls 106, 106', 108, 108' can be removed from the frame 105. For example, side walls 106, 106', 108, 108' can be removed from and/or reattached to areas 107, 107', 109, 109', respectively, of the frame. This allows an end user or manufacturer to replace one or more of the internal, center or external panels and then easily reinsert the sidewalls back into the frame 105.

At least one of the side walls 106, 106', 108, 108' includes an access panel 111 (shown in FIG. 7) which covers an access opening 208, where a thermal control system 700 can be accessed, inserted and/or removed when the access panel 111 is removed. For example, as shown in exemplary FIG. 4, the access panel 111 can be a cutout portion of rear panel 108' such that when the access panel 111 is removed an access opening 208 is provided that is sized to be large enough that the thermal control system 700 can be accessed and/or accepted therethrough.

Referring to FIGS. 5A-D, the delivery box 100 may have an internal release mechanism 222 that allows unlocking of the locking mechanism 502, 504. The internal release mechanism 222 is configured to be used when the access door 104 is in the closed and locked position with the container 102. In the embodiment shown in FIG. 5A, the internal release mechanism 222 is disposed in the access door 104 but it should be understood that the internal release mechanism 222 can be placed at any other location, such as in the container 102.

The internal release mechanism 222 can be any system that is configured to be unlocked upon activation by a user. For example, the internal release mechanism 222 can work with a mechanical locking system, an electromagnetic lock system, or any other locking mechanism whereby the internal release mechanism 222 is configured to be an additional way to unlock the locking system. In the embodiment shown in FIGS. 5A-D, the system includes an electromagnetic lock system having an electromagnet 502 and a magnet 504. In this embodiment, the internal release mechanism 222 can be a bar 500 that that extends in the access door 104 such that when the bar 500 is depressed pushes a lip portion 506 into an activation area 508, so that when this process occurs, a switch is activated that breaks current to an electromagnetic lock system 502/504. In this regard, the electromagnet is deactivated and the lock is unlocked. This allows someone that is locked within the container 102 to open the box 100 while locked inside.

Figure 6B:
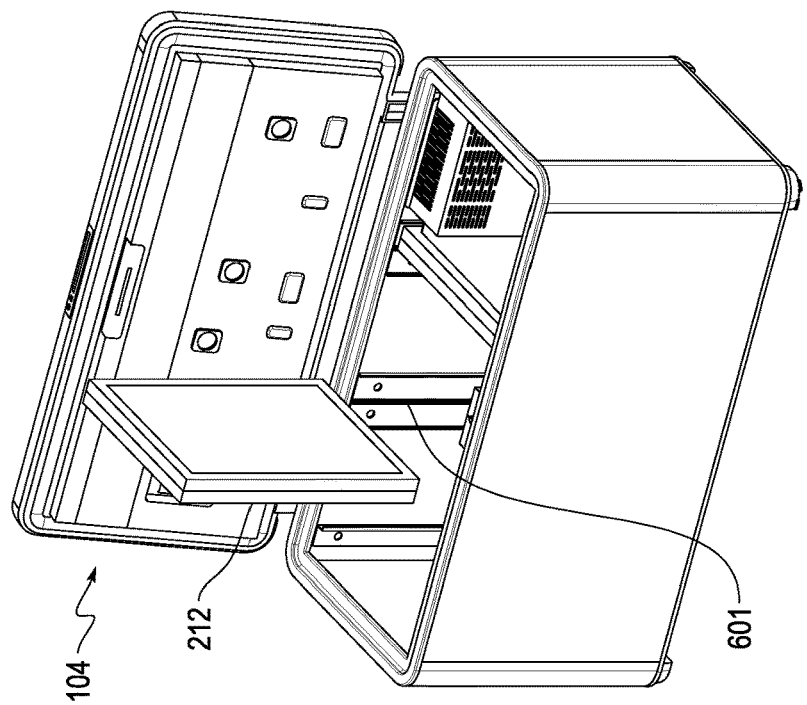
FIGS. 6A and 6B illustrates a separator of a delivery box according to one embodiment.
Figure 6A:
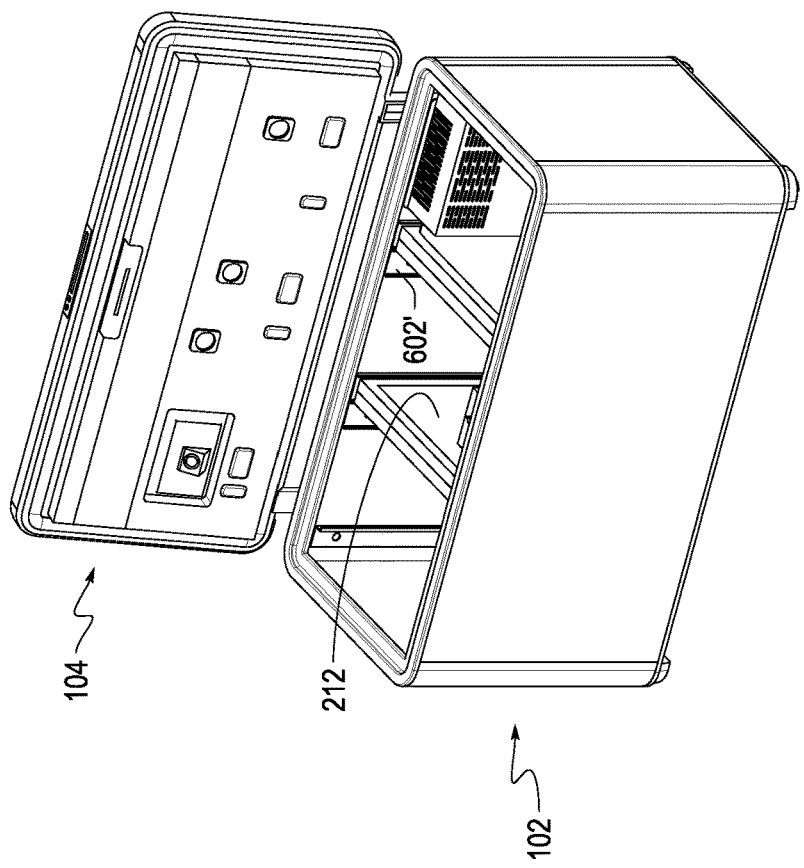

As shown in FIG. 6, the delivery box 100 may include removable dividers 212, 212'. The dividers 212, 212' may be different sizes for different sized packages. The dividers 212, 212' may be used to divide a cooler into zones for goods that may require temperature control (e.g. groceries, frozen food deliveries and the like), or any other desired storage compartment. In an alternative embodiment, the temporary storage device could be configured in a weather-proof or water resistant manner to temporarily protect the parcel from environmental elements or degradation. Moreover, the storage compartments may be easily removable or interchangeable to allow the user to select a preferred storage feature. In one embodiment, the delivery box 100 may be used to allow one zone to include a bar to hang certain goods (e.g., dry-cleaning, new clothes, rugs, posters and the like).

In one embodiment, the dividers 212, 212' allow for different cooling zones. For example, in the exemplary embodiment of FIG. 6, the dividers 212, 212' define three zones. The zones may be a freezer zone, a refrigeration zone, a heated zone, and/or a zone with no thermal cooling or heating (and the climate control is discussed later herein). The dividers 212, 212' may be removably inserted into the container 102 using guide rails 601 and can be secured into position by the frame 105 which can be inserted over top of the dividers 212, 212' once inserted. Each of the dividers 212, 212' may be insulated in order to maintain the thermal zones to control the thermal environment of the zones. Additionally, the dividers 212, 212' allows for the humidity of each of the zones to be controlled so that different zones can have different humidities as controlled by the controller based on input from user interface.

It should be understood that the dividers 212, 212' may be removed so that the box only have one large compartment. Also, there may be any number of dividers 212, 212' and they present invention should not be limited to the number of dividers 212, 212'.

Figure 7B:
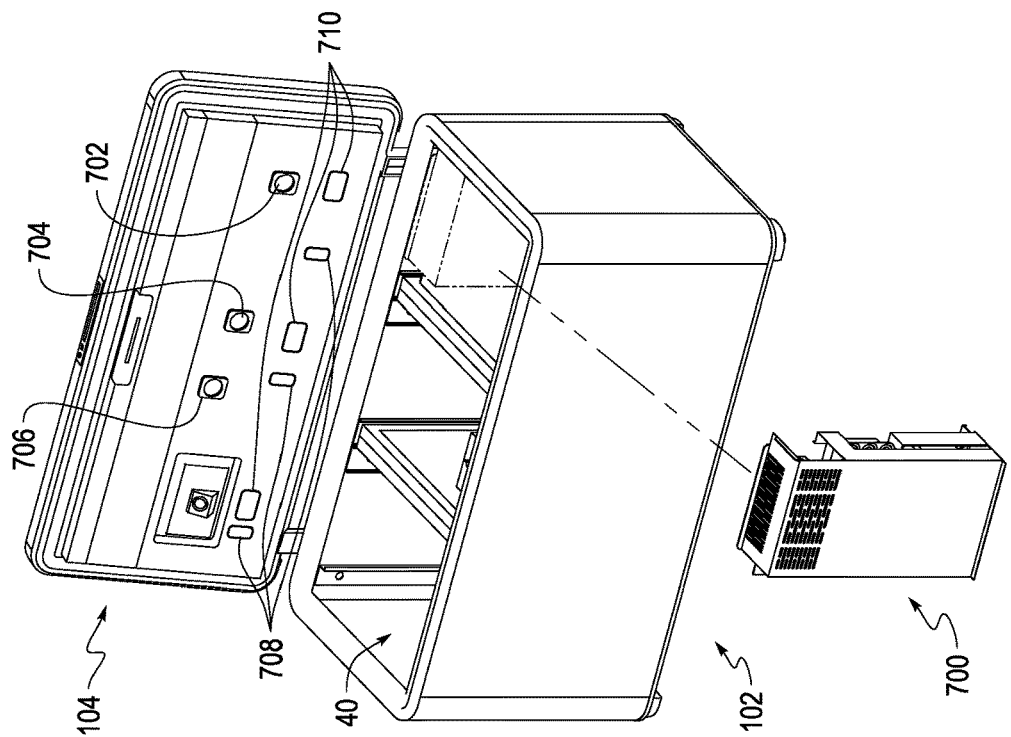
FIGS. 7A and 7B illustrates a cooling system in a delivery box according to one embodiment.
Figure 7A:
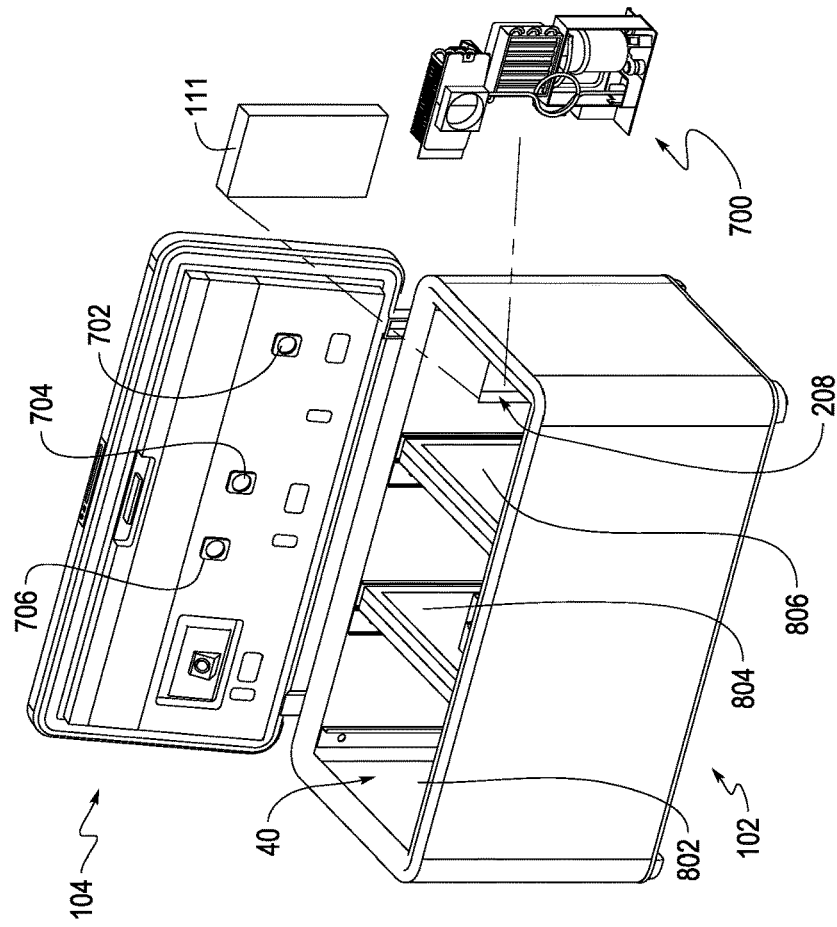

FIG. 7 illustrates a thermal control system 700 that is configured to be disposed within the compartment 40 of the container 102. The thermal control system 700 includes electronics, a compressor, a fan, and/or other components that may be used to generate cool/warm air. The thermal control system 700 is configured to be inserted into the compartment via a hole 208 created by removing the knock-out portion 111 of the rear side wall. The thermal control system 700 may also include a humidifier to be able to change the humidity of the air in the container 102; however, this humidifier may be a separate from the thermal control system 700.

The access door 104 may include a series of temperature detectors 708 as well as lights 710 and/or UV LEDs. As shown in the exemplary embodiment of FIG. 7, the compartment 40 is split into three compartments 802, 804, and 806 (see also FIG. 8) using dividers, and there are three temperature detectors 708 and three lights 710—one for each divided compartment. In this regard, the temperature of each respective divided compartment 802, 804, and 806 can be independently monitored and each zone can be lit up using the lights 710 as desired. Moreover, it should be noted that the system may also include humidity sensors to monitor the level of humidity in each zone and report these measurements to the controller.

Also, it should be noted that the system may also include UV-C LEDs that could irradiate UV light in one or more components and while the Figures do not explicitly show UV LEDs, the UV LEDs could be implemented in the access door similar to the lights 710. The UV-C LEDs will be installed in a module that will snap into position on the lid interior as LEDs. The UV-C lights may be programmed to turn-on after a delivery when the lid is closed and locked in order to sterilize the surfaces of surfaces exposed to the UV-C LED light. It will be turned off after an appropriate period. The UV-C LEDs may be turned on again when the box is determined to be empty in order to sterilize the interior of the empty box. UV-C LEDs are effective in killing bacteria, spores, viruses and other pathogens.

The UV-C LED may output any UV light to disinfect the interior space of the container. The UV-C LED may be disposed in the same area as the lights and may be controlled remotely (i.e., without any user present at the delivery box). The UV-C LEDs only turns on when the access door 104 is closed to the container 102 and is configured to be controlled to turn on after an item has been removed from the container 102 to disinfect the container from any bacteria or other pathogen brought into the container from the item, in some embodiments. Additionally, the UV-C LED may activate immediately after an item is placed in the box 100 so that the item is disinfected when placed in the box 100. The UV-C LEDs may be placed in various locations, such as in the access door, in the container, and/or the like so that light therefrom can reach all surfaces of the item and the interior of the container. The interior surface of the container may be reflective so that a single UV-C LED disposed in each respective zone would disinfect all of the interior surfaces of the container and the access door.

In one embodiment, one or more of the UV-C LEDs may be disposed in the delivery box and a cage be disposed in the box to separate the item from the interior surfaces of the box from the item so that when the UV-C LEDs are activated, all surfaces around the item in the box 100 may be contacted by the UV-C LED light thereby disinfecting the surfaces.

Also, the temperature of each individual divided compartment 802, 804, and 806 can be independently controlled as well, as is explained with reference to FIG. 8 below. It is noted that each of the compartments 802, 804, and 806 are divided so that air does not freely move between the compartments without the fans being activated (or ducts or dampers being activated), in some embodiments. In other embodiments, the compartments could not be completely divided so that some airflow can move between compartments but the airflow is limited due to the dividers.

Figure 8B:
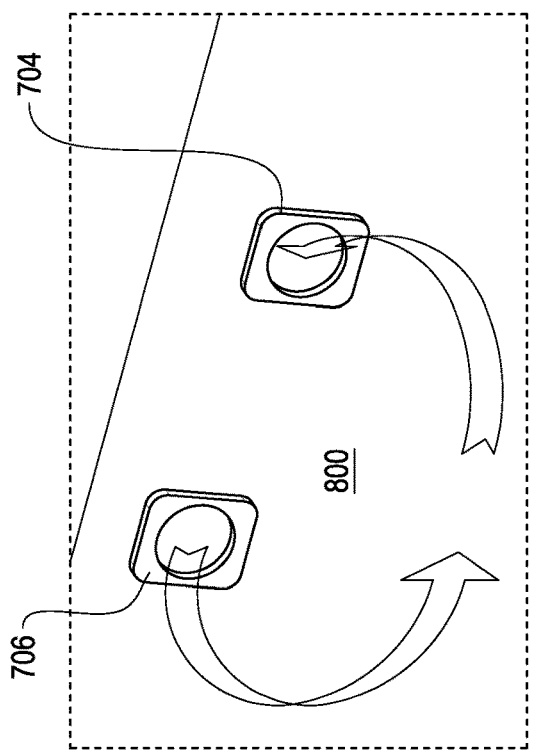
FIGS. 8A, 8B, and 8C illustrates an air transport system of a delivery box according to one embodiment.
Figure 8C:
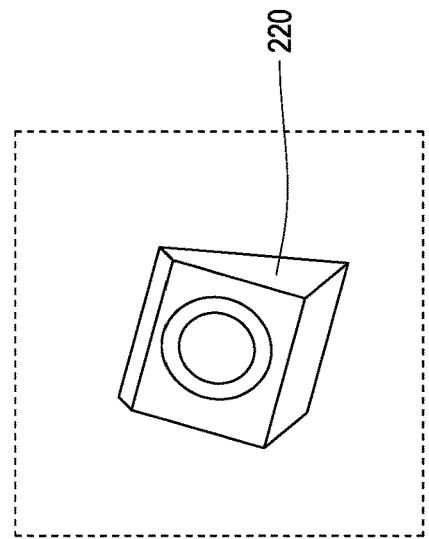
Figure 8A:
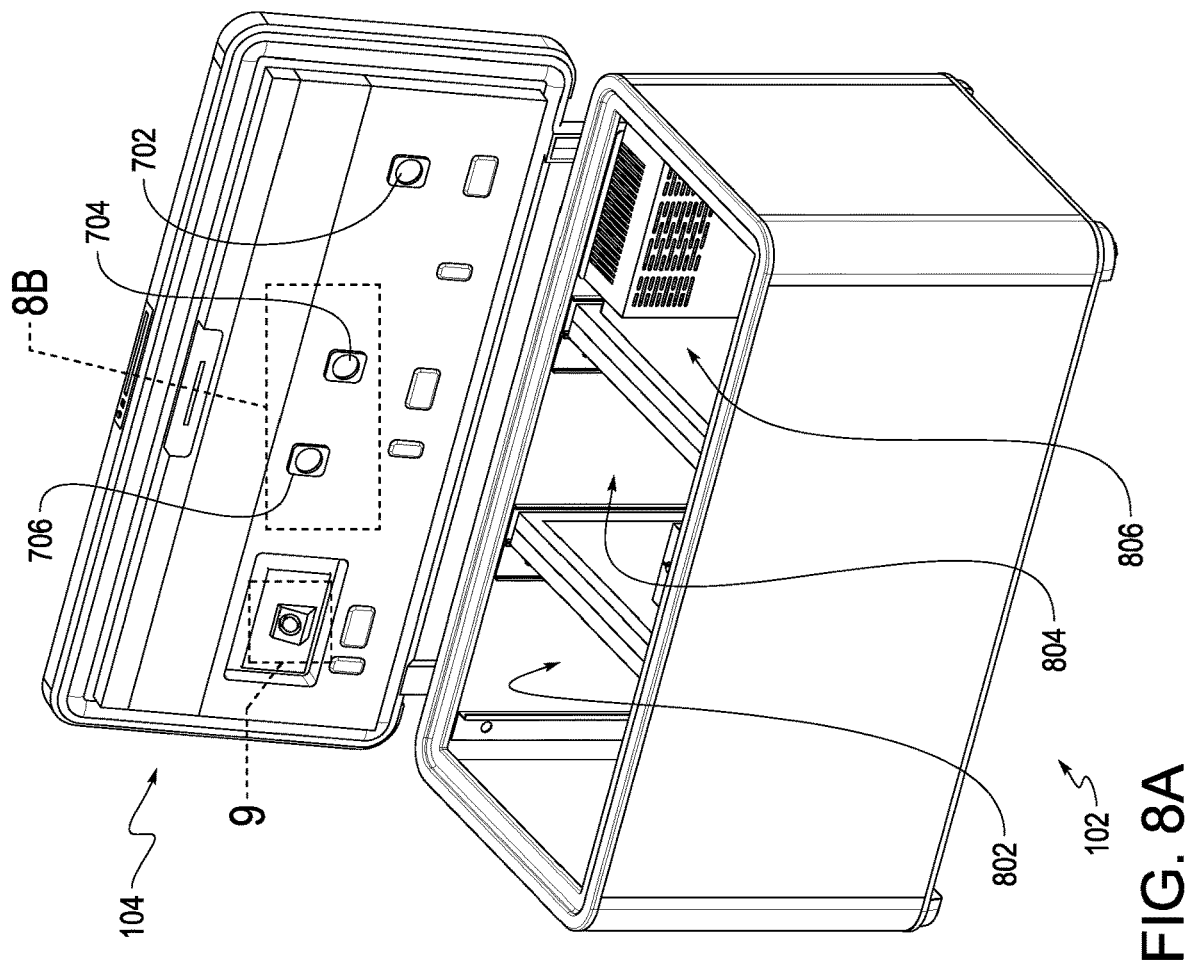

In FIG. 8, it is shown that there are multiple fans 702, 704, and 706 which regulate the air between zones. In this regard, the fans 702, 704, and 706 are controlled using a controller based on input by the user as to what each zone would be. The thermal control system shown in FIG. 7 could deliver cold or warm air to the different zones via the fans (and it is noted that the humidity of such air could be controlled as well using a humidifier). For example, FIG. 8 illustrates the thermal control system 700 is disposed in compartment 806. In this regard, compartment 806 can be a refrigerated compartment (based on the user setting this compartment as a refrigerated compartment).

In this same embodiment, compartment 804 could also be a refrigerated compartment and the fans 702 and 704 would be employed to move air between 804 and 806.

Moreover, even further in this same embodiment, compartment 802 could be not climate controlled. In this regards, the fan 706 would not operate in compartment 802 so that the cool air in zones 804 and 806 stay in those zones.

In this regard, the fans 702, 704, and 706 all work together to deliver air (either cooled or heated air) to the respective compartment. As shown in FIG. 8, the fans 702, 704, and 706 may all be disposed in the access door 104 of the delivery box 100. However, the present invention should not be so limited and the fans 702, 704, and 706 could be disposed in another other area of the delivery box 100.

For each compartment, the user could set the temperature to be at a specific predefined temperature (e.g., X degrees). If the temperature outside of the box is greater than the specific predefined temperature X degrees (e.g., in hot temperatures in the summer months) such that the temperature in a desired compartment is greater than the specific predefined temperature X degrees as detected by one of the temperature detectors, the controller would turn on the thermal control system 700 to generate air colder than the specific predefined temperature X degrees until the temperature in the desired zone is about the specific predefined temperature X degrees. The fan(s) would then turn on to deliver the cooled air to only the compartment where the temperate was higher than the specific predefined temperature (X degrees).

Also, if the temperature outside of the box is less than the specific predefined temperature X degrees such that the temperature in a desired compartment becomes less than the specific predefined temperature X degrees as detected by one of the temperature detectors (e.g., in freezing temperatures in the winter), the controller could turn on the thermal control system 700 in such a manner (e.g., reverse the compressor) to generate air warmer than the specific predefined temperature X degrees until the temperature in the desired zone is about the specific predefined temperature X degrees. The fan(s) would then turn on to deliver the heated air to only the compartment where the temperate was lower than the specific predefined temperature (X degrees). This can also be done using heater 800 that could be incorporated into the fan ductwork of the delivery box and controlled by the controller.

In this regard, in one embodiment, a heater 800 may be incorporated into the box 100 to heat a particular zone requested by the user and controlled by the user.

Figure 9B:
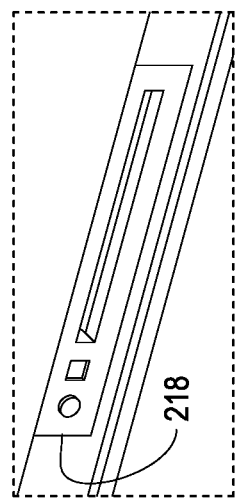
FIGS. 9A and 9B is illustrates a camera system of a delivery box according to one embodiment.
Figure 9A:
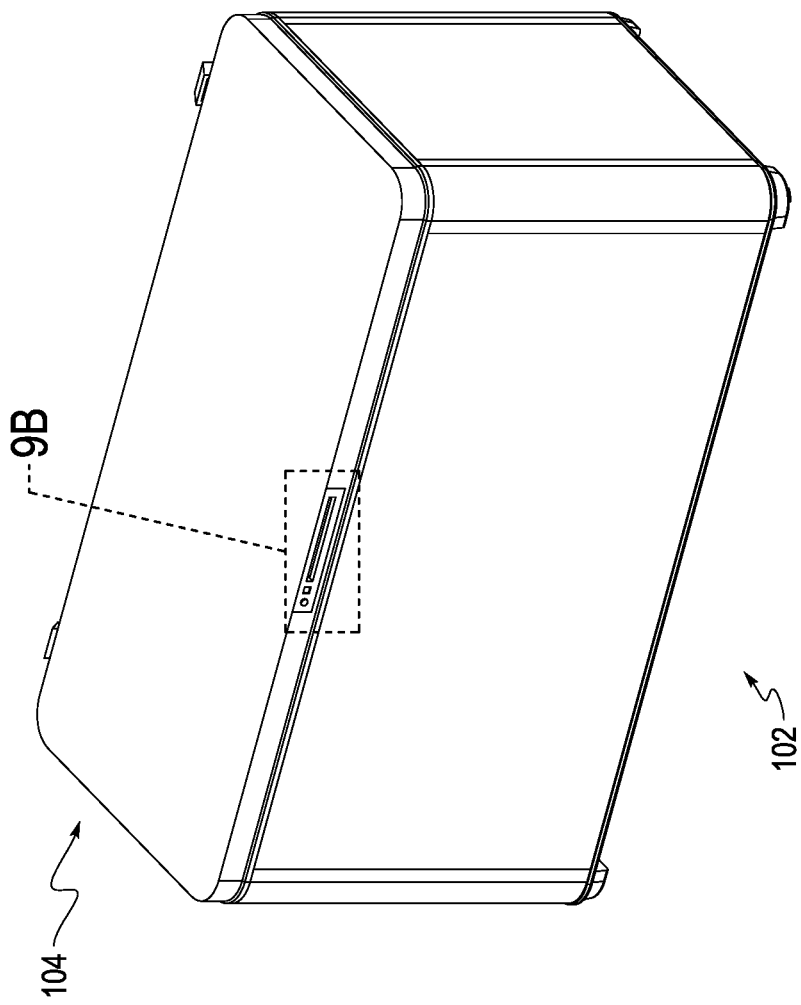
Figure 10C:
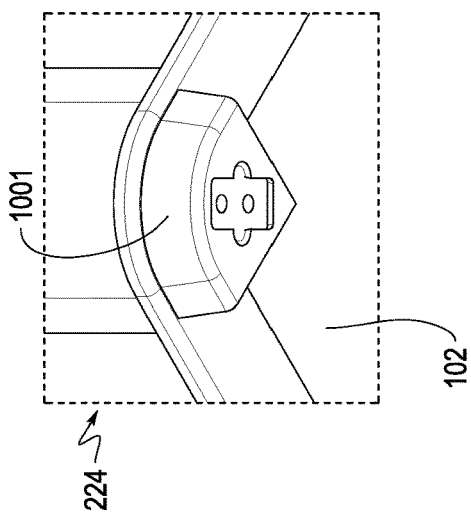
FIGS. 10A, 10B, 10C, 10D, and 10E illustrates various anchoring systems a delivery box in open position according to some embodiments.
Figure 10E:
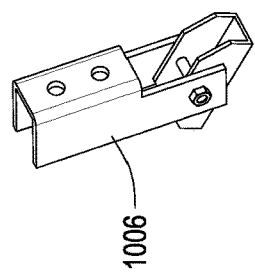
Figure 10B:
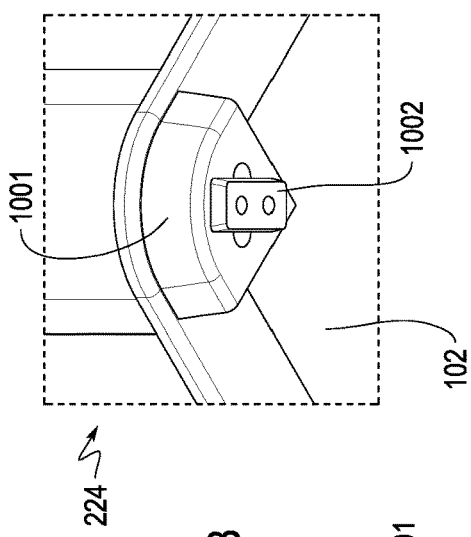
Figure 10D:
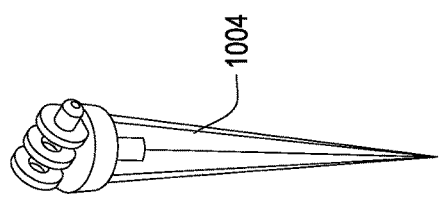
Figure 10A:
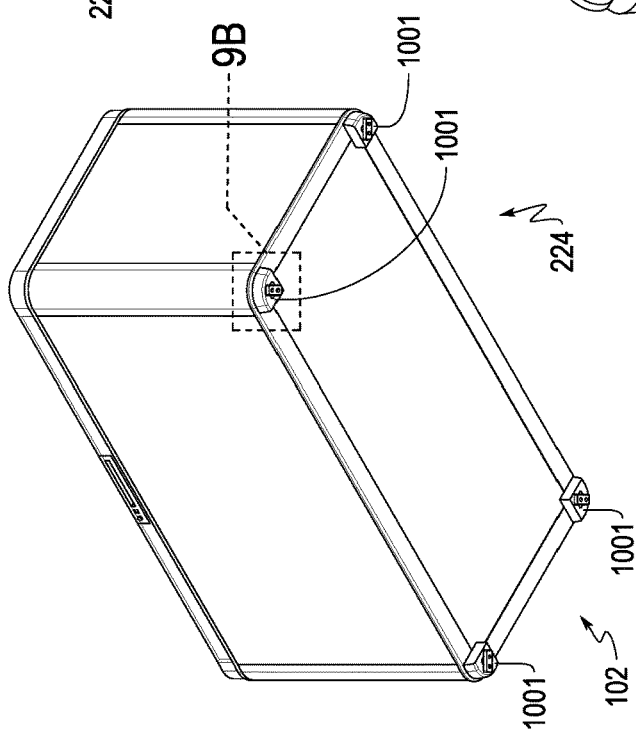

The delivery box 100 may optionally include a portion which allows visual inspection of the contents (e.g., window, cameras, etc.), as shown in the exemplary embodiments of FIG. 9. For example, in FIG. 9, the access door 104 may include an interior camera 220 which is configured to view contents in the container 102 when the access door 104 is closed and an exterior camera 218 which is configured to view exterior surroundings of the delivery box 100 when the access door 104 is closed (such as to view someone approaching the delivery box 100). The interior camera 220 would also be able to capture images when the access door 104 is opened, such as to be able to view a user accessing the container 102 or conducting a video conference with another user using the interior camera 220 and the transceiver.

The delivery box 100 may also include any other indication device to provide convenient notification of the existence of a delivery waiting inside the lock box (e.g., flag, light and or the like). The storage device may be suitably configured with the appropriate electronics and telecommunications technology to allow the transmission of a signal to the inside of a home or office, to a cellular device, to a networked device (e.g., a computer or tablet), and/or the like. The signal may indicate that the access door has been opened, closed or tampered with. The internal portions of the storage device may include a suitable detector (pressure, light beam, weight and/or the like) which may also transmit a signal indicating the existence of a delivery. Also, the user may manually indicate that the box is empty via the mobile application. This could be set via an "empty" or "not empty" flag in the database.

Such an indication device may comprise a lamp which is actuated by means of a switch, such as a microswitch, located within the storage device. Deposit of a parcel or other item inside the compartment 40 of the delivery box 100 would cause actuation of the microswitch which would cause current to be applied to the lamp and further cause illumination thereof indicating that a parcel has been placed in the storage device. When the parcel is removed from the storage device, the weight removed from the microswitch would cause the switch to open and current to be removed from the lamp, causing termination of the illumination thereof. The lamp may be LED or any other suitable form of display.

As mentioned above, the delivery box 100 may also include, in some embodiments, a locking device 50 in communication with a switch, a control unit and/or an input device for receiving data. The input device is optional and may be configured to allow the input of a personal security code or access code to access the temporary delivery box 100. The input device may read and/or accept any form of data, such as, for example, numbers, letters, characters, symbols, fingerprint, eyeprint, magnetic, bar code, smart card, infrared, electromagnetic waves, voice sample and/or the like. In an exemplary embodiment, the input device is a keypad assembly, which is communicatively linked to the control unit, and includes a 12 character keyboard comprising keys 0-9, and an ENTER key and a CANCEL key to confirm or cancel the desired operation. The keypad allows the user to input a personal security code or an access code into the input device and the information is transmitted to the control unit and then to the electrical switch. In an exemplary embodiment, a personal security code unique to a particular intended recipient of delivered goods is entered into the temporary storage device and stored within a memory allowing the intended recipient access to the temporary storage device using the same personal security code each time. Preferably, the security code would be numeric, 4 to 6 characters in length. The security code could be changed periodically, depending on the preference of the intended recipient. The keypad also enables entry of an access code to enable temporary access of the temporary delivery box 100 by the commercial carrier using the same code as the recipient code, a special delivery person code or a one-time use code. Preferably, the access code would also be numeric, 4 to 6 characters in length. Alternatively, the access code and other information could be shown on a display associated with the keypad, preferably an LCD display.

The delivery box 100 may include power supplied by the home or business, its own integral power supply, as well as a battery back-up which may be used by the control unit to supply DC power to itself and to the input device and to the locking device should the AC power fail. The power supplied to the control unit may optionally be provided by solar power.

In order to access the delivery box 100, a commercial carrier (or other entity) would input in his mobile device an indication that the carrier is at the delivery box 100. The mobile device sends a signal to communicate with one or more servers to request the delivery device to be unlocked as will be explained more with regard to FIGS. 11-16. If the backend server(s) authenticates the carrier to use the delivery box 100, an "unlock" signal is sent to the delivery box 100 and the electrical switch means is activated by communication with the control unit to cause unlocking of the locking device 50 so that the access door 104 may be opened by the commercial carrier. The control unit controls the unlocking of the locking device 50 associated with the access door 104 by activation of the electrical switch means. A wide variety operable locking devices comprising a locking device and switch means may be used by one skilled in the art, such as, mechanical, magnetic, electrical, optical and/or the solenoid controlled latch. Application of a low voltage signal or pulse to energize the solenoid associated with the electrical switch means results in movement of the latch to an unlocked position, and subsequent removal of the energizing signal returns the latch to a locked position.

After successful entry of the access code by the commercial carrier, the locking device 50 would be switched to an unlocked position allowing the access door 104 to be opened. The commercial carrier would then set the delivered good into the compartment 40 of the temporary delivery box 100. Upon closing the access door 104, the locking device 50 would return to the locked position thereby securing the delivered good inside. In another embodiment, if the door remains open for longer than a predetermined amount of time, an alarm or other indicia will be activated or a signal sent by the alerting system 228 to the recipient's computer, pager, phone or personal digital assistant. Retrieval of the good by the intended recipient may then be provided by entry of a similar temporary access code or permanent security code in the manner described above.

As shown in FIG. 10, the delivery box 100 can be physically secured to a floor using a mounting system 224. The mounting system 224 may be different mounting devices that are mounted to the four legs 1001 of the box, such as using pads 1002, an anchor 1004 that is placed in the ground or hinged mounted feet 1006 that are anchored to concrete or other surface of the floor. This makes the box 100 unmovable.

Figure 11:
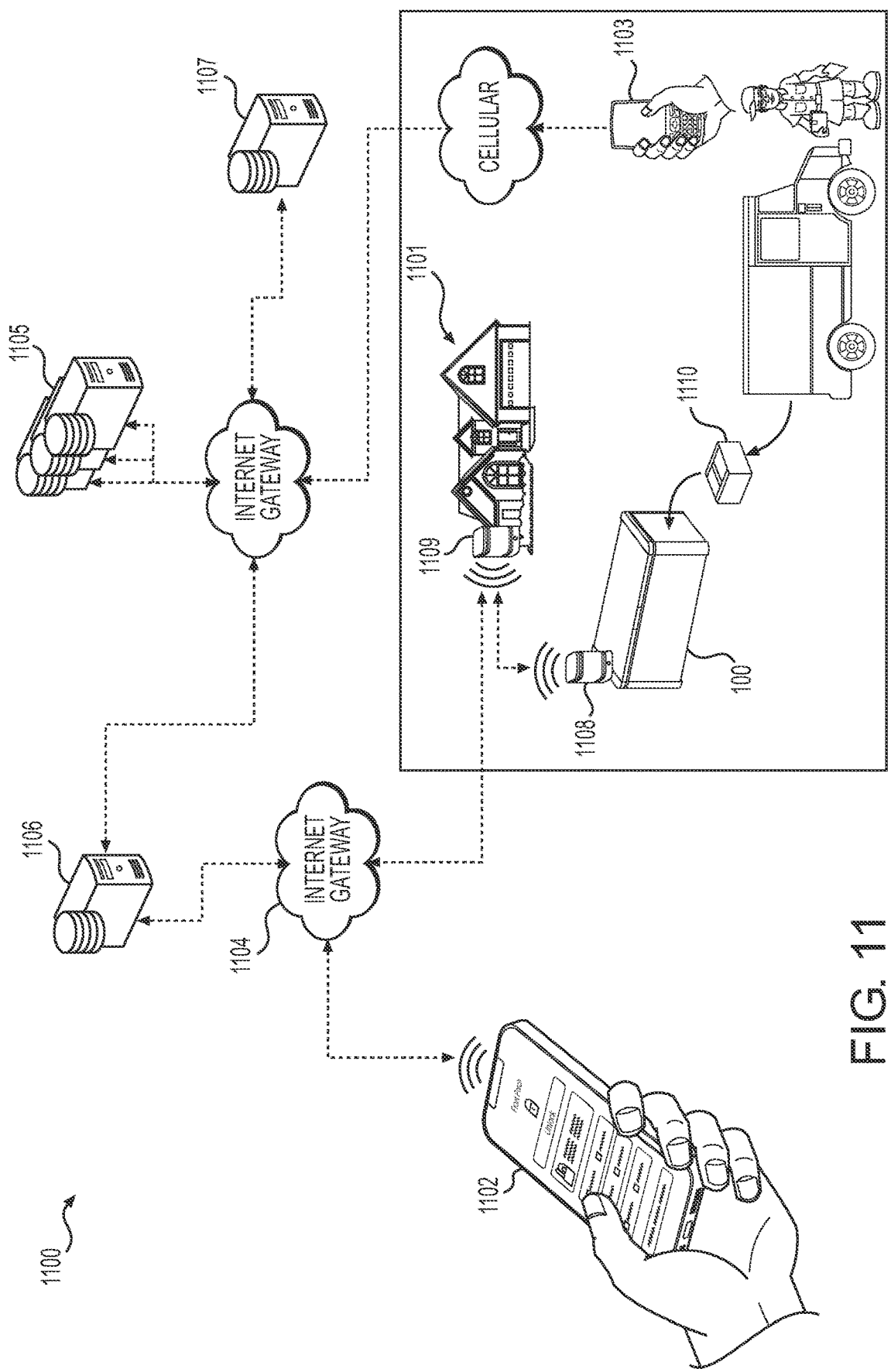
FIG. 11 illustrates a diagram of a system of a delivery box according to some embodiments.

The below description now refers to FIGS. 11-14 where FIG. 11 illustrates a system diagram of operation of a system 1100 showing a commercial carrier delivering a package to a location according one embodiment and FIGS. 12-16 are methods for providing a delivery to and/or accessing from the delivery box 100.

In FIG. 11, a user mobile device 1102 of a user is connected to an internet gateway 1104 which is connected with backend server 1106. The user is shown in FIG. 11 as being remotely located from the user's home 1101. A commercial carrier is shown in FIG. 11 delivering a package 1110 to delivery box 100. The commercial carrier has a mobile device 1103 which may be connected to the Internet via cellular connection.

The user's home 1101 may include a transceiver 1109 (e.g., a router) that is connected to the internet 1104 and a transceiver 1108 of the delivery box 100 so that the delivery box 100 is effectively connected to the internet 1104. In one embodiment, the delivery box 100 could be connected to the internet via other connections, such as via a cellular connection.

In addition, multiple carrier servers 1105 and multiple retailer servers 1107 are connected to the internet and to the backend server 1106 so that the carrier servers 1105 and the retailer servers communicate with the backend server 1106. In this regard, the backend server 1106 is a server that is able to coordinate communications from the retailer servers 1107, the carrier servers 1105, the delivery box 100, and the user mobile device 1102. Various embodiments are disclosed below of methods of operation for the system with reference to FIGS. 12-16.

Figure 12:
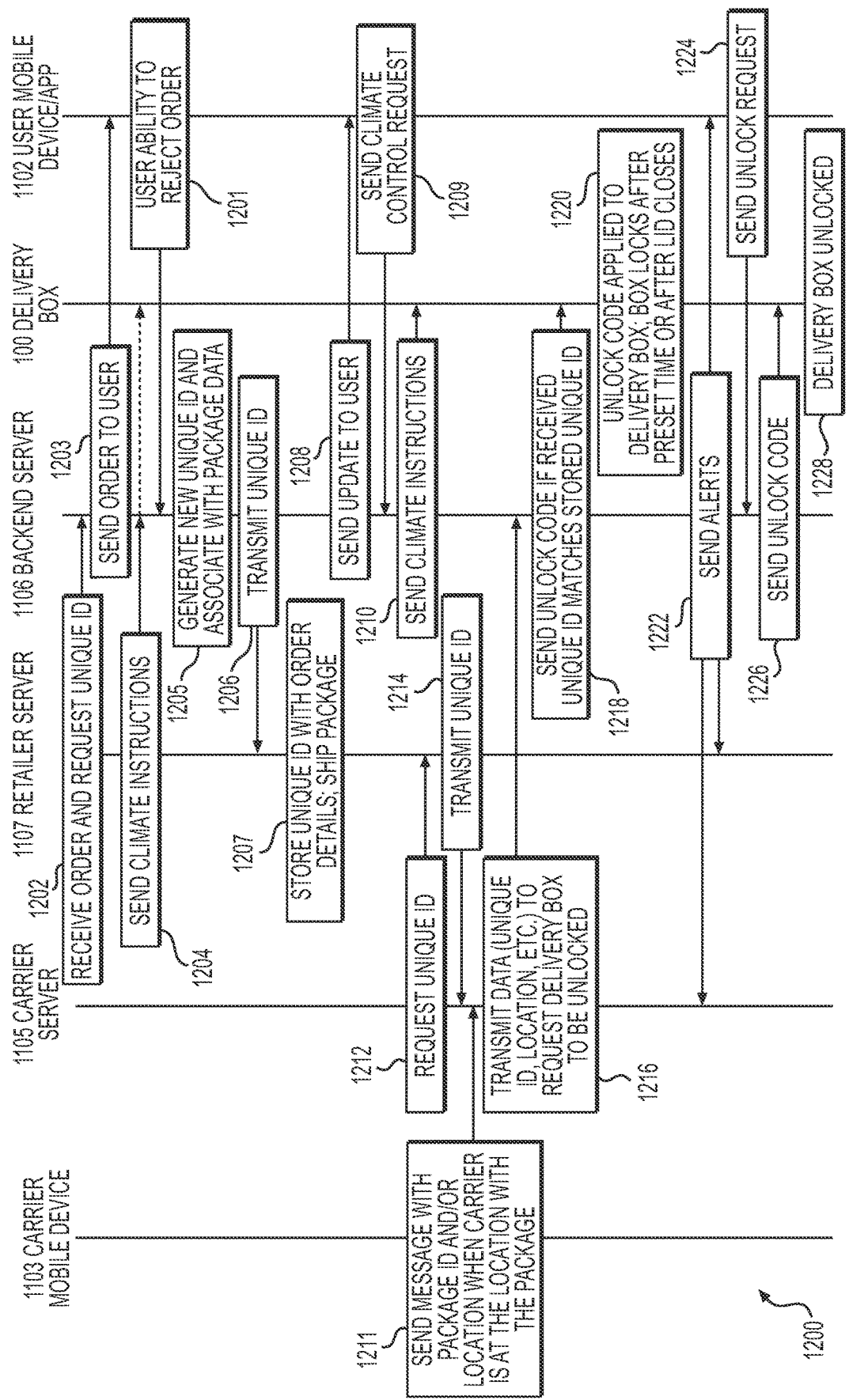
FIG. 12 illustrates a method for delivering goods to a delivery box according to some embodiments.

Referring first to FIG. 12, FIG. 12 illustrates a method of an item bought by a user being delivered to a delivery box 100 and retrieved by the user thereafter. Accordingly, in some embodiments, a purchaser identifies/selects a particular good that should be placed in the delivery box (such as by buying something online from any merchant which delivers purchased goods by commercial carrier). For example, a transaction may take place, such as an order is placed with a retailer and the retailer's server 1107 then would request a unique ID from the backend system 1106 (step 1202). The items may be ordered from a computer, internet web site, catalog, telephone, interactive television or any other ordering service by submitting the necessary data and requesting delivery to a building by any common carrier such as, Federal Express™, USPS™ or UPS™ or any corporation's delivery service (e.g., Petsmart, Staples, etc.). The purchaser could place an order by selecting and paying for the desired good in a manner provided by the merchant, such as over the phone or through the internet, by entering a credit card number or other means of payment into a telephone keypad or computer keyboard.

It should be understood that the present invention should not be limited to a user placing an order with a retailer, but any other transaction or event may occur for the delivery box 100 to be utilized. In this regard, any time an item is intended to be placed and/or retrieved from the delivery box 100, a system may request the delivery box to be utilized. Embodiments used herein are for an order to be placed with a retailer simply for ease of illustration of FIG. 12 and thus, the present invention should not be so limited.

Referring back to FIGS. 11 and 12, when the backend server 1106 receives an order from a retailer server 1107, the order details are sent by the backend server 1106 to the user mobile device/application 1102 (step 1203). At that point, the user is able to view the order details in the application via a mobile device such as a cellular phone. In one embodiment, step 1203 occurs when the user requests the order details from the user's mobile device via the user's application.

In one embodiment, the user has the ability to reject the order and thus reject a server completing the process to allow the delivery box 100 to be unlocked (step 1201). The user can indicate rejection of the order using the user interface which then sends a request back to the backend server 1106 which will then not execute step 1205 (discussed below). Thus can happen in response to the user receiving order details from the backend server 1106.

In step 1204, the retailer server 1107 may send climate control instructions to the backend server 1106 which would instruct the controller of the delivery box 100 at the appropriate time prior to scheduled delivery of the item to the delivery box 100. In this regard, the climate of the delivery box 100 could be controlled at a time prior to the package being delivered so that the climate is at the desired climate when the package is inserted into the delivery box 100 (as opposed to the climate turning on when the package is deposited).

Also, when the backend server 1106 receives an order from the retailer server 1107, the backend server 1106 then may generate or assign a new unique identifier (also referred to herein as "unique ID") that is associated with the package and/or order data (step 1205) in a backend database (e.g., a database located at the backend server or on the backend server 1106). For example, a unique ID of A31F3 may be generated and be associated with tracking number #12345 and/or order number #4565 for a package that was ordered through the retailer server 1107. The unique ID could also or alternatively be associated in the backend database with carrier information, the number of the particular delivery box 100 associated with the intended address, the retailer, a combination of any of the above, and the like in order to associate the unique ID with the package so that when the carrier is at the intended delivery location, the system will be able to identify that the data received relates to correct package being delivered to the intended delivery location.

In this regard, it should be noted that the backend server 1106 may include and/or communicate with the backend database that includes a plurality of entries of various delivery boxes 100 at different addresses as well as the addresses of the delivery boxes and unique identifiers associated with packages to be delivered to these respective delivery boxes 100, whereby unique identifiers are associated with respective delivery boxes 100. For example, the backend server 1106 may assign/generate a unique identifier #234 to a package that is to be delivered to a home located at 100 Main Street, City A, State A which is associated with delivery box #515. Thus, an entry in the backend database could be:

| Unique ID | Home Address | Delivery Box |
|---|---|---|
| 234 | 100 Main Street, City A, State A | 515 |

Referring back to FIGS. 11-12, after the unique ID is generated, the backend server 1106 may transmit the unique ID to the retailer server 1107 (step 1206), where the retailer server 1107 may then store this information in a retailer database for future authentication (step 1207), in various embodiments.

At this point, the package may be shipped or may already be in transit to the intended location 1101 that has a delivery box 100 associated therewith. An update regarding the package being shipped and other information (climate instructions, date of estimated delivery, package contents, tracking number, etc.) may be sent to the user mobile device/application 1102 (step 1208) (which may occur in response to the user's mobile device requesting such information via the user's mobile application).

At step 1209, the user may send a climate request to control the climate (temperature, humidity, etc.) of the delivery box 100 as the user desires. This could mean overriding the climate control request sent in step 1204 so that the user controls the delivery box climate controls and timing thereof. This may occur based on when the estimated delivery time of the item as indicated by the retailer. In any event, the user is allowed to control the climate via the user application on the user mobile device 1102 at any time.

Whenever the user sends instructions to control the climate of the delivery box 100 and/or sends instructions as to when the delivery box climate will be turned on, the backend server 1106 will receive such requests and store them on the backend server 1106 and/or send the instructions to the delivery box controller, which in turn, controls the climate control system 203.

It should be noted that steps 1209 and 1210 can be performed at any time during the method 1200 and the present invention should not be limited in this regard.

When a carrier delivers a package to such location 1101 (e.g., a home or business) and thus, is physically at the location 1101 of the delivery box 100 with the package, the carrier enters into a carrier mobile device 1103 an input that indicates that he/she is at the location 1101 of the intended delivery box (i.e., the delivery box associated with the mailing address indicated in the purchase order) and has a package or item to deliver to (and/or retrieve from) the delivery box 100. In response to such input into the carrier mobile device 1103, the carrier's mobile device 1103 transmits a message to a carrier server 1105 over the Internet 1104 via a cellular connection or other networked connection (step 1211). This message may include an identifier of the package/item (such as a tracking number or another identifier that identifies the package) and/or a location of the carrier (e.g., GPS location, house address, delivery box number, etc.).

The carrier server 1105 can, in one embodiment, request the unique identifier assigned by a backend server 1106 associated with the delivery box in response to receiving the message from the carrier's mobile device 1103 (step 1212). The carrier server 1105 could know the retailer server information because the retailer server address may be provided to the carrier server when the retailer server sends shipment information to the carrier server 1105. In the request sent by the carrier server 1105, the unique ID request may include "request information", such as the package order details, the package's tracking number, recipient information, address information, carrier information, and/or any other information or combination thereof to identify the package to the retailer server.

When the retailer server 1107 receives the unique ID request from the carrier server 1105, the retailer server 1107 compares the above-mentioned request information, with pre-stored database entries in the retailer database to determine if the request information matches data already stored in the retailer database. If so, the retailer server 1107 then retrieves only the pre unique ID (stored in step 1207) associated with the matched database entry, and transmits that retrieved unique ID to the carrier server 1105 (step 1214).

In this embodiment, after the carrier server 1105 receives the unique ID assigned/generated by the backend server 1106 that is associated with the delivery box 100, the carrier server 1105 may then send a request that includes the unique ID and the location of the carrier (e.g., GPS location, entered home address, delivery box number, etc.) to the backend server 1106 to unlock the delivery box 100 at the location 1101 (step 1216).

The backend server 1106 could then compare the information in the message (e.g., unique identification number, the location, etc.) with database entries to determine if the data in the message (e.g., combination of unique identification number and location) matches the same data within a single database entry in the backend database. If so, the backend server 1106 authenticates the carrier and sends and "unlock" message to the delivery box 100 via the Internet 1104 (step 1218). It is noted that the delivery box 100 may be networked to the Internet 1104 via a network (e.g., via WiFi or cellular connection).

In response to the delivery box 100 receiving the unlock message, a controller of the delivery box 100 (after processing the unlock message) authenticates the unlock message to determine if the unlock code is proper, and upon determining that the unlock code is authentic, then would unlock the delivery box 100 (step 1220).

The carrier could then open the access door 104 of the delivery box 100 and deposit in (and/or retrieve from) item(s) in the delivery box 100 and close the access door 104, which then could automatically lock itself upon closure or after a predetermined time period.

Upon locking, an alert could be sent out to one or more or all parties (step 1222), such as by the delivery box 100 sending a message, via transceiver 1108, back to the backend server 1106 via Internet 1104 indicating the box is locked and the database at the backend server is updated accordingly. Also, an alert could be sent to the retailer server 1107 and the carrier server 1105 as well as to an alert (e.g., SMS message, email, etc.) to the user's mobile device 1102 (e.g., cellular phone, computer, mobile application, etc.) registered to the user that is associated with the delivery box 100.

Additionally, other alerts may be sent out including an authentication attempt failing, alert to the carrier device 1103, or the like.

When the access door 104 is closed, the exterior camera 218 and the interior camera 220 can take pictures and store these pictures (and/or transmit these pictures). The cameras would take a picture of the package inside in the delivery box 100 with the interior camera 220 when the door is closed. The exterior camera 218 could take a picture immediately when the access door 104 is closed such that a picture of the person closing the access door 104 is taken. Also, when the access door 104 is opened, the interior camera 220 can take pictures and store these pictures (and/or transmit these pictures) to record an image of a person and/or actions the person is taking (e.g., placing an item into the box 100, etc.). It is noted that the system stores timestamps when all pictures are taken and this information is stored along with the pictures.

It is noted that video could be take instead of or in addition to the pictures and the present invention is not limited to the cameras taking images or even videos. For example, the cameras could be used to stream data such as real-time two-way communication video.

The above integration uses location and package identifiers to automatically unlock the delivery box 100 at an intended location for a carrier to deposit a package, in some embodiments. The user is not required to input any information at any point after purchase of the product and simply will get a notice that the package has been delivered to the delivery box.

When the user is ready to retrieve the item from the delivery box 100, the user sends an unlock request, which can be done via the user's mobile device/application 1102, via an interface on the delivery box, via a computer, or the like, (step 1224), and an unlock code is sent to the backend server 1106 similar to the unlock code sent in step 1218 (step 1226). The delivery box 100 will be unlocked at step 1228 similar to step 1220 and the user then retrieves the item deposited by the carrier and closes the access door 104.

Figure 13:
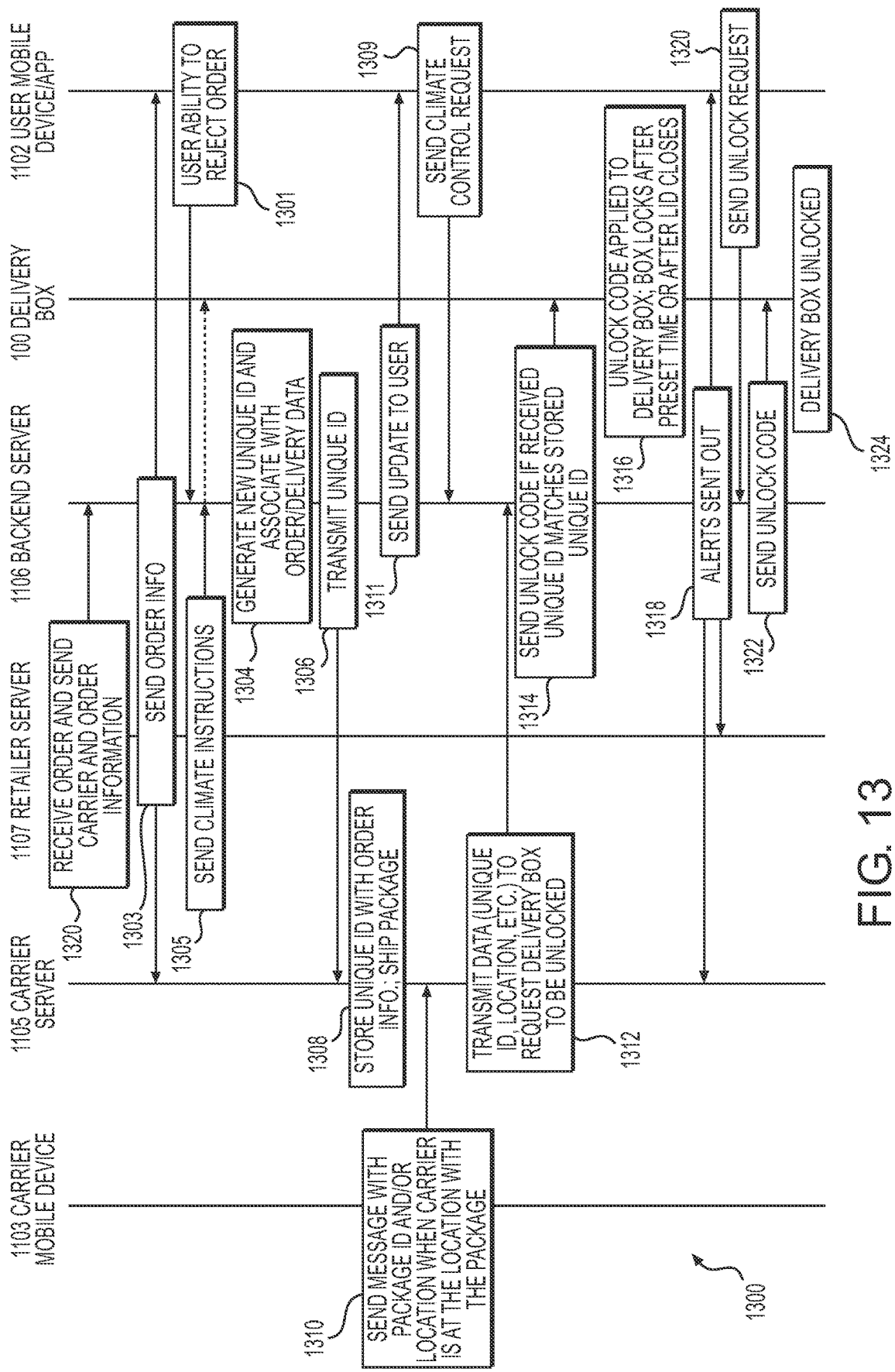
FIG. 13 illustrates a method for delivering goods to a delivery box according to some embodiments.

FIG. 13 is another embodiment of a method of unlocking the delivery box 100 to allow an item to be deposited into (and/or retrieved from) the delivery box 100. First, an order is received and the order information (e.g., package information, carrier information, etc.) may be sent to the backend server 1106 (step 1302). The order information is also sent to the carrier server 1105 as well (step 1303) and this may be sent by the retailer server 1107 and/or the backend server 1106. It is noted that, if the backend server 1106 sends the order information to the carrier server 1105, this may occur in conjunction with step 1306 discussed below.

In one embodiment, the user has the ability to reject the order and thus reject a server completing the process to allow the delivery box 100 to be unlocked (step 1301). The user can indicate rejection of the order using the user interface which then sends a request back to the backend server 1106 which will then not execute step 1304 (discussed below). Thus can happen in response to the user receiving order details from the backend server 1106.

If there is no rejection request but after the order is sent, climate instructions may be sent from the retailer server 1107 to the backend server 1106 (which will then directly control the delivery box climate) and/or directly to the delivery box 100 from the retailer server 1107. Step 1305 is similar to step 1210.

Upon receipt of this new order information, the backend server 1106 generates a new unique ID and associates the unique ID with one or more items of the order information (e.g., product address, intended recipient, package details, etc.) (step 1304). This is done by storing all of the order number in a single database entry. In this regard, the backend server 1106 will also select a delivery box 100 associated with the address in the order information and store the selected delivery box in that same single database entry. This process is done for every new order except that a new database entry and new unique ID is created for each order.

After the unique ID is generated and stored with the associated package data and delivery box 100, the unique ID only may be sent to the carrier server 1105 (step 1306). Upon receipt of the unique ID, the carrier server 1105 stores the unique ID with the order information (step 1308). The package is shipped and may be done so in step 1308 or any time after the order is received by the retailer server 1107.

Step 1310 of FIG. 13 is similar to step 1210 of FIG. 12 in that when the carrier is at the intended delivery box 100 and is ready to deposit the package therein, the carrier's mobile device 1103 sends a message to the carrier server 1105 with the package information (e.g., any information that could identify the package) along with location information providing the carrier is physically at the delivery box 100.

In step 1311, the user is updated with information and this may be accomplished throughout method 1300 and the user is above the climate control request in step 1309. Steps 1311 and 1309 are similar to steps 1208 and 1209 of FIG. 12, respectively.

At step 1312, the data received by the carrier server 1105 is then used to determine if the data received matches any pre-stored data in data entries in the carrier server database. If so, the carrier server 1105 then retrieves the unique identifiers associated with the matching database entry. This retrieved unique ID may then be transmitted directly to the backend server 1106 to request the delivery box 100 to be unlocked since the carrier is physically at the delivery box 100 and has the package that is intended to be delivered thereto.

It is noted that data other than the unique ID may also be sent to the backend server 1106 for additional security purposes, such as the location of the carrier.

At step 1314, the backend server 1106 then compares the unique ID (and any other additional data received) with data in the backend server database to determine if a match exists, and if so to send an unlock code to the delivery box 100, similar to step 1218 of FIG. 12.

Steps 1316, 1318, 1320, 1322, 1324 would then occur similar to steps 1220, 1222, 1224, 1226, 1228 of FIG. 12, respectively.

Figure 14:
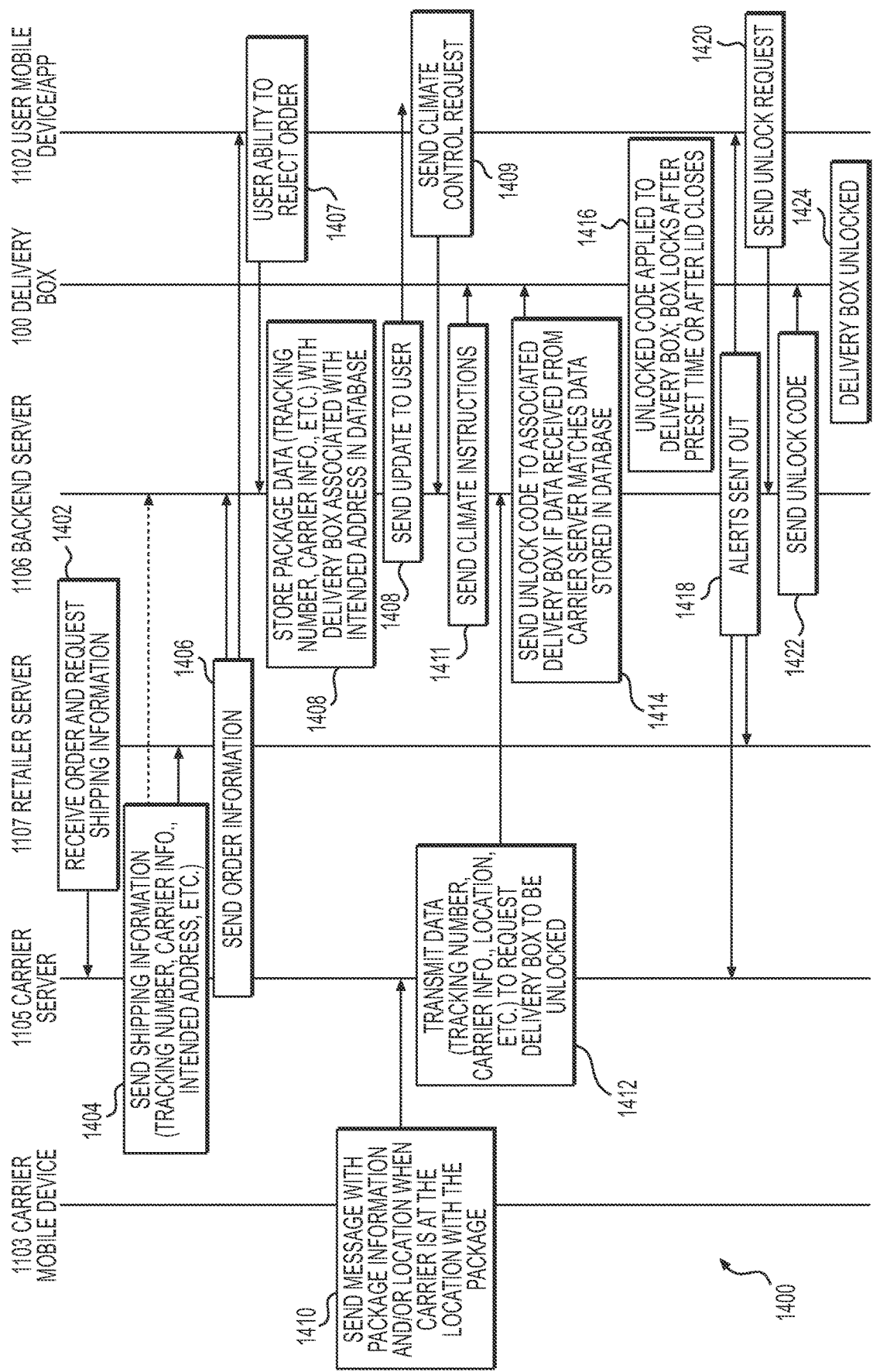
FIG. 14 illustrates a method for delivering goods to a delivery box according to some embodiments.

FIG. 14 is yet another embodiment of a method of unlocking the delivery box 100 to allow an item to be deposited into (and/or retrieved from) the delivery box 100.

First, an order is received and the retailer server 1107 requests shipping information may be sent to the carrier server 1105 (step 1402). The shipping information (e.g., tracking number, carrier information, intended address, etc.) is sent from the carrier server 1105 to the retailer server 1107 (step 1404) and/or to the backend server 1106.

Order information is sent to the backend server 1106 from the carrier server 1105 or the retailer server 1107 (step 1406). If the order information is sent by the retailer server 1107, the shipping information may also be transmitted to the backend server 1106 by the retailer server 1107.

In one embodiment, the user has the ability to reject the order and thus reject a server completing the process to allow the delivery box 100 to be unlocked (step 1407). The user can indicate rejection of the order using the user interface which then sends a request back to the backend server 1106 which will then not execute step 1414 (discussed below). Thus can happen in response to the user receiving order details from the backend server 1106.

In step 1411, climate instructions may be sent from the retailer server 1107 to the backend server 1106 (which will then directly control the delivery box climate) and/or directly to the delivery box 100 from the retailer server 1107. Step 1411 is similar to step 1210.

Regardless, the backend server 1106 may receive both the order information and the shipping information, and in response thereto, the backend server 1106 may store, in a backend database, package data including both the order information (package information, intended recipient information, etc.) and the shipping information (tracking number, carrier information, etc.) in connection with a selected delivery box 100 (step 1408). The delivery box 100 may be selected based on being associated with the address provided from the shipping information.

At any point after the order is received in step 1402, the package is shipped, and when the package is delivered to the intended address physically proximate to the delivery box, the carrier will send a message with package information and optionally location information (indicating the location of the carrier) to the carrier server 1105 (step 1410). This message may be sent via a cellular or other wireless connection from the carrier mobile device.

In step 1408, the user is updated with information and this may be accomplished throughout method 1400 and the user is above the climate control request in step 1409. Steps 1408 and 1409 are similar to steps 1208 and 1209 of FIG. 12, respectively.

At step 1412, shipping information, such as tracking number, package number, order number, carrier information and other information which may identify the package, is transmitted to the backend server 1106 to request the delivery box 100 to be unlocked (step 1412). Such transmission is sent to request the delivery box 100 to be unlocked since the carrier is physically at the delivery box 100 and has the package that is intended to be delivered thereto.

It is noted that other data other may also be sent to the backend server 1106 for additional security purposes, such as the location of the carrier.

The package data (e.g., tracking number, package number, etc.) (and optionally other data) received at the backend server 1106 from the carrier server 1105 is then used to determine if the data received matches any pre-stored package data in data entries in the backend server database. If so, the backend server 1106 then transmits an unlock code directly to the delivery box 100 (step 1414).

Steps 1416, 1418, 1420, 1422, 1424 would then occur similar to steps 1220, 1222, 1224, 1226, 1228 of FIG. 12, respectively.

In FIG. 15, the user is allowed to provide access to the delivery box 100 directly to another user. In step 1501, the first user inputs, into the first user's mobile application on the user's mobile device, information to allow a second user that the first user would like to have access to the delivery box 100. The first user is the owner of the delivery box 100. The second user may want to deliver an item into the first user's delivery box and/or retrieve an item the first user has placed in his delivery box. Whatever the case, the first user can provide the second user with temporary access to the first user's delivery box using method 1500.

In step 1502, a request for authorization of the second user is sent from the first user's mobile device to the backend server 1106. The backend server 1106, upon receipt of the authorization request stores the request with an ID associated with the second user (an ID of the second user being generated if none exists), at step 1504.

The second user is then notified of the authorization request provided by the first user at step 1506. This may be accomplished using text message, email or application notification, which will provide the name of the first user and the location of the delivery box 100 that the second user is authorized to access. The notification also may include a time expiration of the second user's authorization to the delivery box so that the authorization request only allows the second user to have temporary access to the delivery box 100. When the second user receives this notification, the second user then knows that he/she can travel to the first user's delivery box 100.

At step 1508, when the second user arrives at the location (e.g., a home or business) of the first user's delivery box 100 and thus, is physically at the location of the delivery box 100, the second user enters into the second user's mobile device an input that indicates that he/she is at the location of the intended delivery box (i.e., the delivery box associated with the first user) and has a package or item to deliver to (and/or retrieve from) the delivery box 100. In response to such input into the second user's mobile device, the second user's mobile device transmits a message to a backend server 1106 over the Internet 1104 via a cellular connection or other networked connection. This message may include the second user ID and/or a location of the second user (e.g., GPS location, house address, delivery box number, etc.).

In step 1509, the backend server 1106 receives the data sent back the second user's mobile device and compares the information to information stored at the backend server 1106 or backend database (not shown), and the backend server 1106 determines if a match exists between the user ID received and the user IDs in the backend server/database. If a match exists, the backend server 1106 determines if the second user is authorized (an authorization flag is currently stored) and verifies the authorization has not expired. If the second user is currently authorized, the backend server 1106 sends and "unlock" message to the delivery box 100 via the Internet 1104 (step 1510).

In response to the delivery box 100 receiving the unlock message, a controller of the delivery box 100 (after processing the unlock message) authenticates the unlock message to determine if the unlock code is proper, and upon determining that the unlock code is authentic, then would unlock the delivery box 100 (step 1512).

The carrier could then open the access door 104 of the delivery box 100 and deposit in (and/or retrieve from) item(s) in the delivery box 100 and close the access door 104, which then could automatically lock itself upon closure or after a predetermined time period.

Upon locking, an alert could be sent out to one or more or all parties (step 1516), such as by the delivery box 100 sending a message, via transceiver 1108, back to the backend server 1106 via Internet 1104 indicating the box is locked and the database at the backend server is updated accordingly. Also, an alert (e.g., SMS message, email, etc.) could be sent to the first and second user's mobile devices (e.g., cellular phone, computer, mobile application, etc.).

FIG. 16 is a more detailed method 1600 showing steps 1224, 1226, and 1228 of FIG. 12 (and like steps of FIGS. 13 and 14). As shown in step 1602, the first user inputs into the mobile application, a request to gain immediate access to the delivery box 100. This may be because the user wants to retrieve an item, do servicing on the box 100, place an item in the box 100 for someone to later retrieve, or for any other reason.

In step 1604, the user sends a request to the backend server 1106 to access the delivery box 100. This request may include the user's ID, location of the user, and/or any other information to identify the user. The user may request access of the delivery box 100 whether the user is remote to or proximate to the delivery box 100 and may be for the user to access the box or could be for the user to allow someone else to access the box while the user has unlocked it.

In step 1606, the backend server 1106 receives the authorization request and checks if the user is authorized by comparing the user's credentials (and/or data in the request) with data stored in the backend server 1106 and/or backend server database. The user ID received in the request (which is only sent if the user is properly logged into the user application), for example, may be compared with user ID stored on the backend server 1106. If there is a match and the system determines the user is authorized to access the delivery box 100, the backend server 1106 sends an unlock command or code to the delivery box 100 to immediately unlock (or unlock at a present time that is provided in the user request).

At step 1610, the unlock code is sent to the controller of the delivery box 100 (via the transceiver of the location 1101). The controller processes the code and determines the code is proper, and as such, unlocks the locking system at the time provided by the unlock command sent by the backend server 1106.

The delivery box 100 is then unlocked and may be accessed.

In step 1612, alerts letting the backend server 1106 and the user know that the delivery box is unlocked for a certain amount of time and after the box 100 is closed and locked may be sent.

The above network embodiment of the present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computing units are connected with each other via a data communication network. The network is a public network and assumed to be insecure and open to eavesdroppers. In the illustrated implementation, the network is embodied as the internet.

It is to be understood that while the invention is disclosed in certain forms and embodiments, it is not to be limited to the specific forms or embodiments or parts or methods described and shown herein. It will be apparent to those skilled in the art that various changes may be made without departing from the scope of the invention and the invention is not to be considered limited to what is shown in the drawings and described in the specification.

The invention claimed is:

1. A system comprising:
at least one server configured to:
receive a request, from a retailer server, for a unique user ID code associated with order information of an order;
generate the unique user ID code and associated the unique user ID code with a user ordering an item to be delivered to an address;
transmit the unique user ID code to the retailer server so that the retailer server can send the unique user ID code along with along with the order information to a carrier server,
receive, from the retailer server, the order information, wherein the retailer server is configured for providing delivery instructions to the carrier server;
determine and identify a delivery box associated with the address;
determine the user that is associated with the order based on user data in the order information;
receive, from the carrier server when the item has arrived at the address, a request to unlock a lock of the delivery box identified using the order information by receiving the unique user ID code from the carrier server indicating the carrier server requests to unlock the delivery box indicating the order is ready to be physically delivered into the delivery box;
determine, at a time of delivery, whether the unlock request is authenticated using the order information in the unlock request from the carrier server by verifying the unique user ID code received from the carrier server; and
send an unlock signal to the delivery box associated with the unique user ID in response to the request being authenticated by verifying the unique user ID code received from the carrier server, such that when the unlock signal is sent to the delivery box, the delivery box is remotely unlocked in response thereto.

2. The system of claim 1, wherein the at least one server is further configured to:
receive climate instructions for the interior of the delivery box;
forward the climate instructions to the delivery box so that the climate of the delivery box is controlled based on the received climate instructions.

3. The system of claim 2, wherein the at least one server is further configured to:
wherein the climate instructions are received from the retailer server where the order is originating or from a user device of the user.

4. The system of claim 1, wherein the at least one server is further configured to:
receive a request from the user to unlock the delivery box; and
in response to validating that the request is received from an authenticated device or user, sending an unlock command to the delivery box.

5. The system of claim 1, wherein the at least one server is further configured to:
receive, from a retailer server, order information associated with an order the user placed with a retailer associated with the retailer server;
identify the user and the delivery box based on the received order information;
receiving a request to unlock the delivery box from a carrier server indicating the order is ready to be physically delivered into the delivery box by a carrier;
in response to verifying the request, identifying the delivery box and sending an unlock command to the delivery box.

6. The system of claim 1, wherein the at least one server is further configured to:

receive, from a carrier server, delivery information associated with an order the user placed with a retailer;

identify the user and the delivery box based on the delivery information;

receiving a request to unlock the delivery box from the carrier server indicating the order is ready to be physically delivered into the delivery box by a carrier;

in response to verifying the request, sending an unlock command to the delivery box.

7. The system of claim 6, wherein the at least one server is further configured to:

send, to the user device, a request based on the delivery information;

request, from the user device, authorization for the carrier to access the delivery box; and only in response to receiving authorization from the user device, sending an unlock command to the delivery box.

\* \* \* \* \*